(12) United States Patent
Kasamatsu

(10) Patent No.: US 9,145,276 B2
(45) Date of Patent: Sep. 29, 2015

(54) IMAGE FORMING APPARATUS WITH CONTROL FOR DISCHARGING MANUSCRIPTS INTERPOSED BY TRANSPORT ROLLER, NON-TRANSITORY COMPUTER READABLE MEDIUM STORING IMAGE FORMING PROGRAM, AND IMAGE FORMING METHOD

(71) Applicant: Daisuke Kasamatsu, Aichi-ken (JP)

(72) Inventor: Daisuke Kasamatsu, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 39 days.

(21) Appl. No.: 14/041,136

(22) Filed: Sep. 30, 2013

(65) Prior Publication Data

US 2014/0117611 A1  May 1, 2014

(30) Foreign Application Priority Data

Oct. 25, 2012  (JP) ................................. 2012-235926

(51) Int. Cl.
| | | |
|---|---|---|
| G06K 15/00 | (2006.01) |
| B65H 7/20 | (2006.01) |
| B65H 5/26 | (2006.01) |
| B65H 1/06 | (2006.01) |
| B65H 5/06 | (2006.01) |
| H04N 1/00 | (2006.01) |
| H04N 1/203 | (2006.01) |

(52) U.S. Cl.
CPC .. *B65H 7/20* (2013.01); *B65H 1/06* (2013.01); *B65H 5/062* (2013.01); *B65H 5/26* (2013.01); *H04N 1/0048* (2013.01); *H04N 1/00411* (2013.01); *H04N 1/00482* (2013.01); *H04N 1/00588* (2013.01); *H04N 1/00623* (2013.01); *H04N 1/00694* (2013.01); *H04N 1/00782* (2013.01); *H04N 1/00806* (2013.01); *H04N 1/00811* (2013.01); *H04N 1/2034* (2013.01); *B65H 2402/441* (2013.01); *B65H 2402/46* (2013.01); *B65H 2404/611* (2013.01); *B65H 2405/324* (2013.01); *B65H 2407/21* (2013.01); *B65H 2511/20* (2013.01); *B65H 2511/414* (2013.01); *B65H 2551/212* (2013.01); *B65H 2701/1311* (2013.01); *B65H 2701/1313* (2013.01); *B65H 2701/1914* (2013.01); *B65H 2801/39* (2013.01); *H04N 2201/0081* (2013.01)

(58) Field of Classification Search
CPC .......... H04N 1/00002; H04N 1/00567; H04N 1/00681
USPC ................................ 358/1.1–3.29, 1.11–1.18
See application file for complete search history.

(56) References Cited

U.S. PATENT DOCUMENTS

2005/0057785 A1* 3/2005 Endo ............................. 358/474
2006/0221378 A1* 10/2006 Asahara ....................... 358/1.14

FOREIGN PATENT DOCUMENTS

| JP | H01-179171 A | 7/1989 |
|---|---|---|
| JP | H05-011523 A | 1/1993 |
| JP | H09-244846 A | 9/1997 |

OTHER PUBLICATIONS

U.S. Appl. No. 14/041,208, filed Sep. 30, 2013.

*Primary Examiner* — Marcellus Augustin

(74) *Attorney, Agent, or Firm* — Scully, Scott, Murphy & Presser P.C.

(57) ABSTRACT

An image forming apparatus includes a transport roller; a reading mechanism; a manuscript sensor configured to detect the manuscript; a transport controller which controls the transport roller; a display unit; and a display controller. The display controller is configured such that the display unit is allowed to display a first screen in a case that the manuscript is not detected by the manuscript sensor; and the display unit is allowed to display a second screen indicating a discharge designator to discharge the manuscript from the image forming apparatus in place of the first screen indicating no discharge designator in a case that the manuscript is detected by the manuscript sensor. The transport controller is configured such that the manuscript interposed by the transport roller is discharged without reading the manuscript by the reading mechanism in a case that an input with respect to the discharge designator is accepted.

13 Claims, 11 Drawing Sheets

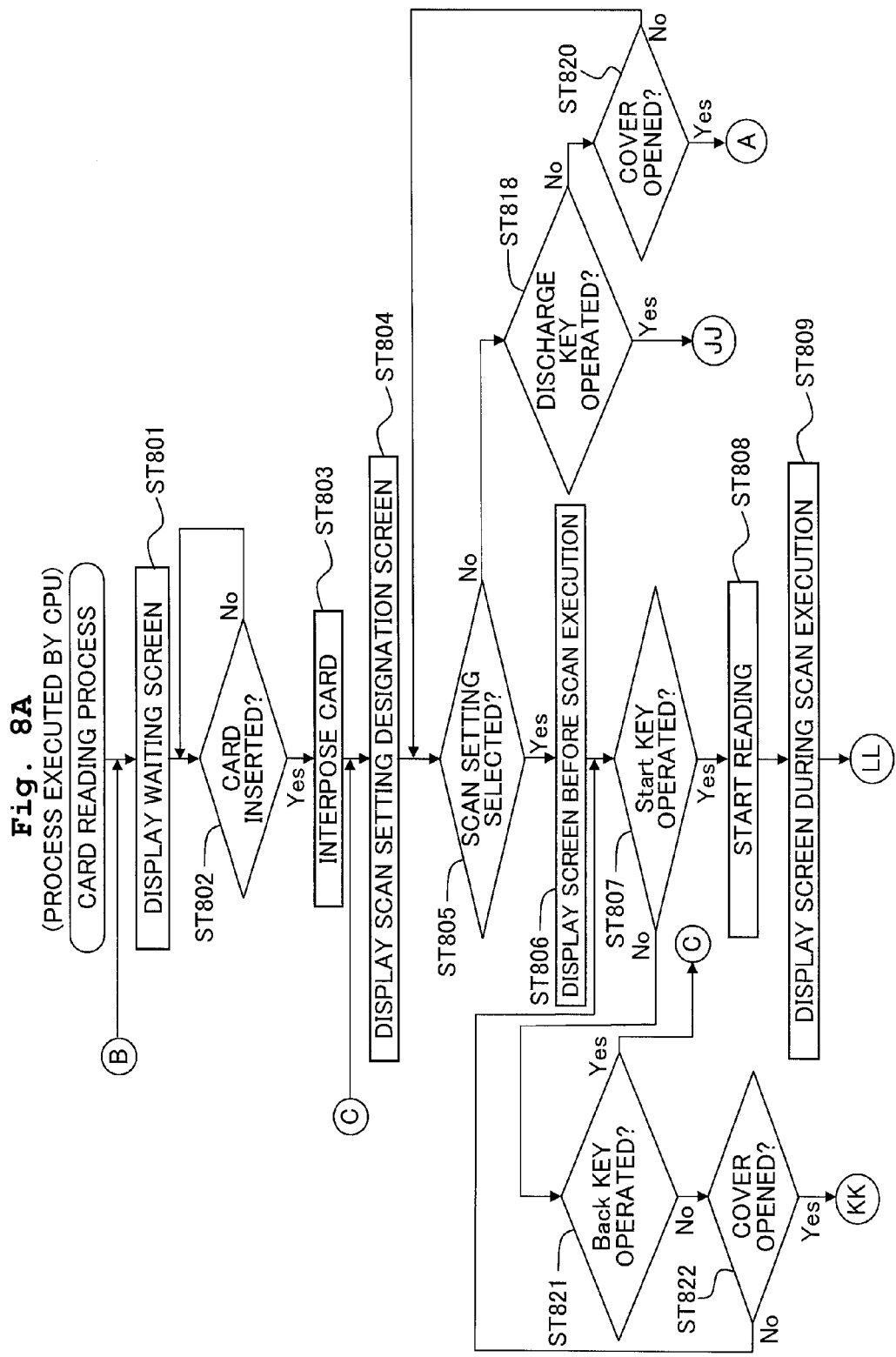

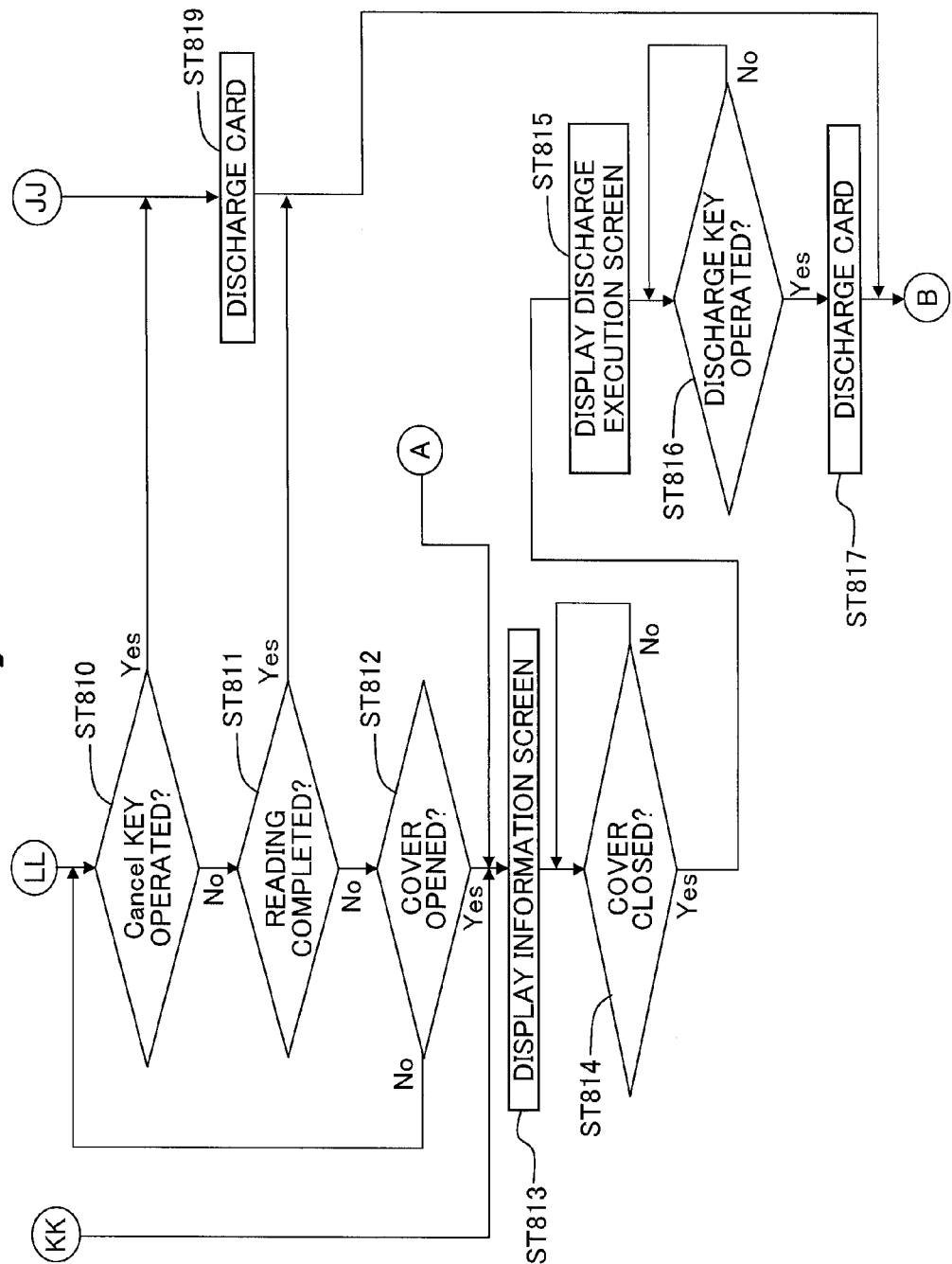

IMAGE FORMING APPARATUS WITH CONTROL FOR DISCHARGING MANUSCRIPTS INTERPOSED BY TRANSPORT ROLLER, NON-TRANSITORY COMPUTER READABLE MEDIUM STORING IMAGE FORMING PROGRAM, AND IMAGE FORMING METHOD

CROSS REFERENCE TO RELATED APPLICATION

The present application claims priority from Japanese Patent Application No. 2012-235926, filed on Oct. 25, 2012, the disclosure of which is incorporated herein by reference in its entirety.

BACKGROUND OF THE INVENTION

1. Field of the Invention

The present invention relates to an image forming apparatus, a non-transitory computer readable medium storing an image forming program, and an image forming method.

2. Description of the Related Art

An image forming apparatus has been hitherto known, wherein the transition or change is made to a screen which is provided in order to execute a reading process for reading a manuscript in response to the setting of the manuscript. For example, a copying machine is known, wherein the display is changed from the display of the present time to the display of, for example, the copying magnification as a copying mode when a manuscript is set to ADF (automatic document feeder) in a state in which the present time is displayed as a present time mode.

SUMMARY OF THE INVENTION

In general, an image forming apparatus is known, wherein a manuscript is interposed or nipped by transport rollers in response to the detection of the setting of the manuscript. When the technique described above is applied to such an image forming apparatus, then the concerning manuscript can be interposed by the transport rollers in response to the setting of the manuscript, and the transition can be made to a screen which is provided in order to set the reading setting for the manuscript such as the copying magnification or the like. On the other hand, when the reading of the manuscript is ceased or terminated after the manuscript having been subjected to the setting is interposed by the transport rollers, it is feared that the manuscript may be broken and/or damaged when a user pulls out the manuscript, because the manuscript is interposed by the transport rollers. Therefore, in such a situation, it is necessary that the transport roller should be rotated to discharge the manuscript. However, in the case of the technique described above, it is not considered that the reading of the manuscript is ceased to discharge the manuscript in the state in which the manuscript is interposed by the transport rollers.

The present teaching has been made taking the foregoing circumstances into consideration, an object of which is to provide an image forming apparatus, a non-transitory computer readable medium storing an image forming program, and an image forming method wherein the operability is improved when the reading of a manuscript interposed by transport rollers is ceased to discharge the manuscript.

According to an aspect of the present teaching, there is provided an image forming apparatus configured to form an image on a manuscript including:

a transport roller configured to transport the set manuscript;

a reading mechanism configured to read the manuscript transported by the transport roller;

a manuscript sensor configured to detect the set manuscript;

a transport controller configured to control the transport roller so that the manuscript is interposed by the transport roller under a condition that the manuscript is detected by the manuscript sensor;

a display unit; and a display controller configured to control display of the display unit, wherein the display controller is configured such that:

the display unit is allowed to display a first screen under a condition that the manuscript is not detected by the manuscript sensor; and the display unit is allowed to display a second screen having a discharge designator to discharge the manuscript from the image forming apparatus in place of the first screen having no discharge designator under a condition that the manuscript is detected by the manuscript sensor; and the transport controller is configured such that the manuscript interposed by the transport roller is transported to discharge the manuscript from the image forming apparatus without reading the manuscript by the reading mechanism under a condition that an input with respect to the discharge designator is accepted.

The present teaching can be realized in various forms including, for example, a control unit or control apparatus for controlling the image forming apparatus, an image forming system, an image forming method, an image forming program, and a recording medium for recording the image forming program thereon.

BRIEF DESCRIPTION OF THE DRAWINGS

FIGS. 8A and 8B show flow charts illustrating a card reading process.

DESCRIPTION OF THE PREFERRED EMBODIMENTS

Figure 1A:
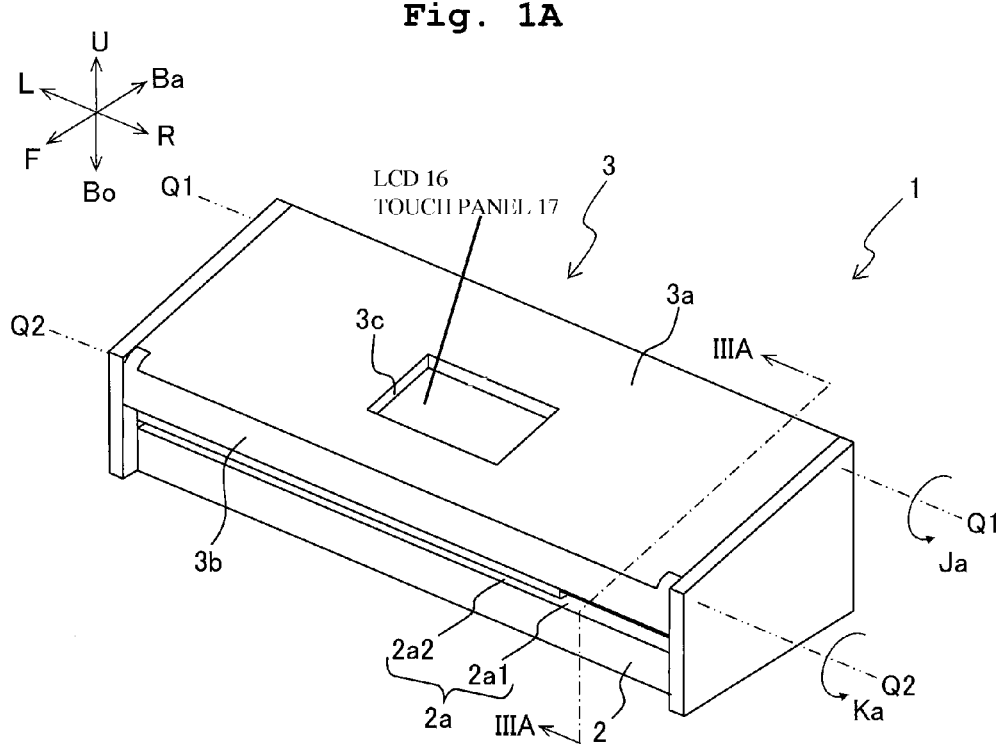
FIGS. 1A and 1B show perspective views illustrating the CDS as viewed from a right forward position and a right backward position respectively.
Figure 1B:
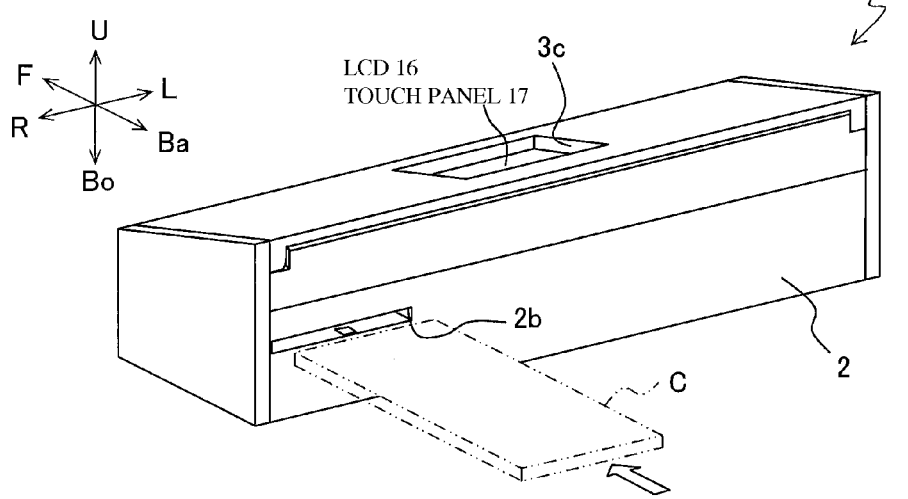

A preferred embodiment of the present teaching will be explained below with reference to the accompanying drawings. FIGS. 1A and 1B show a state in which a cover 3 is closed with respect to a main body unit 2. In the respective drawings of FIGS. 1 to 3, the upward direction of a compact document scanner 1 (hereinafter referred to as "the CDS 1") is indicated by the arrow U, the downward direction is indicated by the arrow D, the forward direction is indicated by the arrow Bo, the backward direction is indicated by the arrow Ba, the rightward direction is indicated by the arrow R, and the leftward direction is indicated by the arrow L. the CDS 1 of this embodiment is constructed as a scanner or an image forming apparatus which is capable of reading a sheet-shaped manuscript such as A4 regular paper or the like and a thick manuscript having a small size such as a driver's license, a credit card, a visiting card or a calling card or the like. In the following description, the sheet-shaped manuscript such as A4 regular paper or the like is referred to as "document", and the thick manuscript having a small size such as a driver's license, a credit card, a visiting card or a calling card or the like is referred to as "card".

the CDS 1 has the main body unit 2 which contains an image reading sensor 18 (see FIGS. 3A and 3B) for reading the document or the card, and the cover 3 attached openably/closably with respect to the main body unit 2. A discharge port 2a is provided on the front surface of the main body unit 2 in order to discharge the document D (see FIG. 2) or the card C read by the image reading sensor 18. The discharge port 2a includes a discharge port 2a1 which is provided on the right side of the main body and a discharge port 2a2 which commonly uses the discharge port 2a1 partially and which extends over substantially the whole of the main body unit 2 in the left-right direction. The discharge port 2a1 is provided as the discharge port for discharging the card C, and the discharge port 2a2 is provided as the discharge port for discharging the document D. Therefore, the heights in the upward-downward direction of the discharge port 2a1 and the discharge port 2a2 reflect the thicknesses of the card C and the document D as the discharge objects respectively, and the thickness of the card C is higher than the that of the document D. On the other hand, an insertion port 2b is provided on the back surface of the main body unit 2 in order to insert the card C into the main body unit 2. The card C, which is inserted into the insertion port 2b, is transported through a first route V1 (see FIG. 3A), and the card C is read by the image reading sensor 18. The card C, which has been read by the image reading sensor 18, is discharged from the discharge port 2a1. Therefore, the CDS 1 of this embodiment makes it possible to allow the image reading sensor 18 to read the card C in a state in which the cover 3 is closed.

LCD 16, which displays various pieces of information, is provided on the upper surface of the main body unit 2. On the other hand, the cover 3 has an opening 3c which is formed at the position corresponding to LCD 16 in the state in which the cover 3 is closed. Therefore, a user can visually recognize the screen displayed on LCD 16 through the opening 3c even in the state in which the cover 3 is closed. A touch panel 17 is superimposed on LCD 16. The user can input the instruction into the CDS 1 by touching the touch panel 17 with a finger or the like via the opening 3c even in the state in which the cover 3 is closed.

The cover 3 includes a first cover 3a and a second cover 3b. The first cover 3a is attached to the main body unit 2 rotatably about the center of the rotational shaft Q1 by the aid of a hinge (not shown). The cover 3 can be closed with respect to the main body unit 2 by rotating the first cover 3a in the direction of the arrow Ja about the center of the rotational shaft Q1. The first cover 3a covers the upper surface of the main body unit 2 in the state in which the cover 3 is closed. On the other hand, the second cover 3b is attached to the first cover 3a rotatably about the center of the rotational shaft Q2 by the aid of a hinge (not shown). When the cover 3 is closed, the second cover 3b can be folded with respect to the first cover 3a by rotating the second cover 3b in the direction of the arrow Ka about the center of the rotational shaft Q2. Therefore, the second cover 3b covers the portion of the front surface of the main body unit 2 disposed over or above the discharge port 2a in the state in which the cover 3 is closed.

Figure 2:
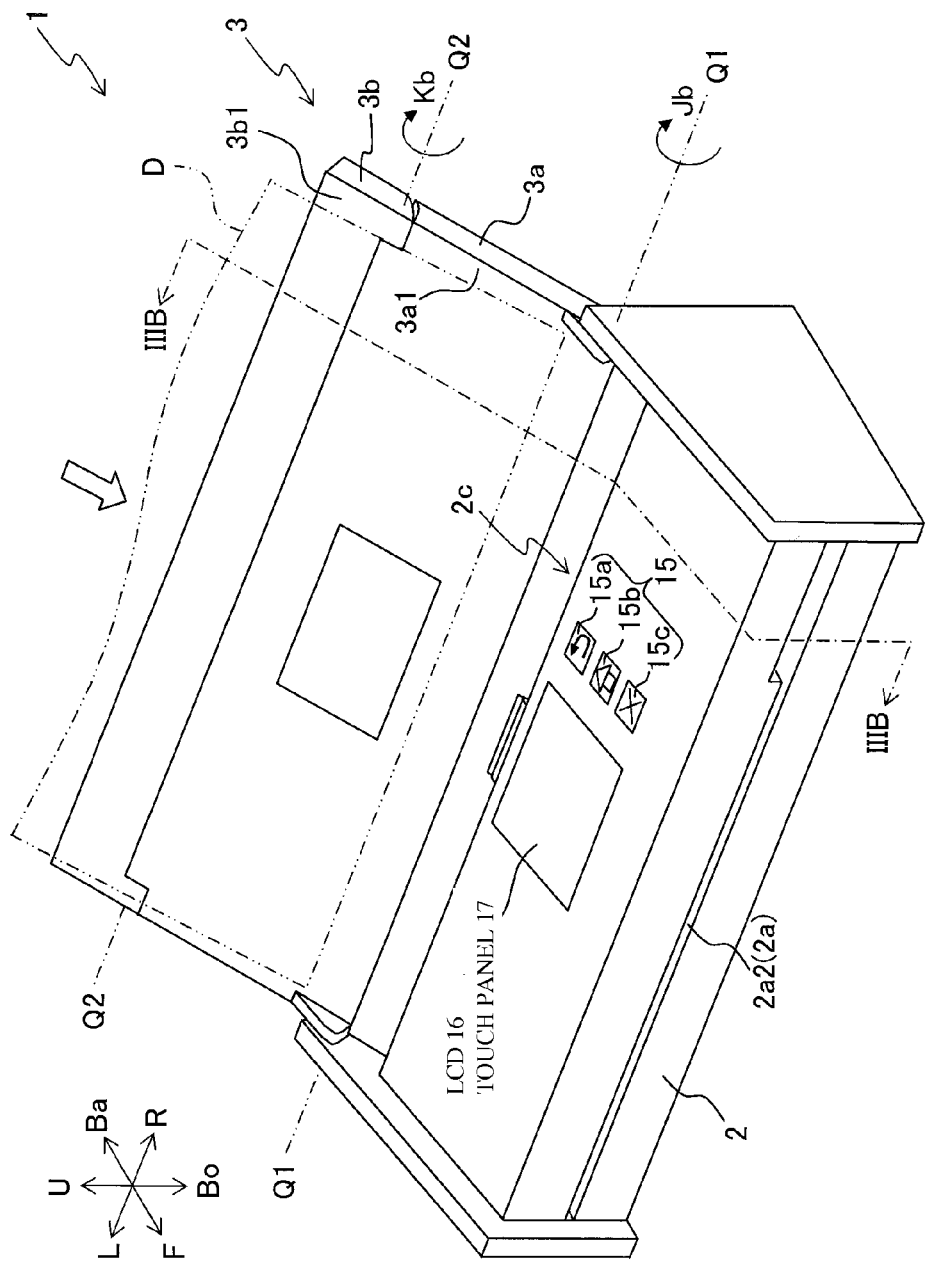
FIG. 2 shows a perspective view illustrating the CDS as viewed from a right forward position in a state in which a cover of the CDS is open.

FIG. 2 shows a perspective view illustrating the CDS 1 as viewed from a right forward position in the state in which the cover 3 of the CDS 1 is open. The cover 3 can be opened with respect to the main body unit 2 by rotating the first cover 3a in the direction of the arrow Jb about the center of the rotational shaft Q1. When the cover 3 is opened, the second cover 3b can be further opened with respect to the first cover 3a by rotating the second cover 3b in the direction of the arrow Kb about the center of the rotational shaft Q2. As a result, the back surface 3b1 of the second cover 3b and the back surface 3a1 of the first cover 3a can be adjusted to be flat. The surfaces 3a1, 3b1, which are adjusted to be flat, function as a paper feed tray for placing thereon the document D as the reading object.

An insertion port 2c is provided on the upper surface of the main body unit 2 in order to insert the document D into the main body unit 2. The document D, whish is set or placed on the placing stand, is inserted from the insertion port 2c. The document D is transported through a second route V2 formed in the main body (see FIG. 3B), and the document D is read by the image reading sensor 18. The document D, which has been read by the image reading sensor 18, is discharged from the discharge port 2a2 (referred to as a discharge port 2a). As shown in FIG. 2, the insertion port 2c is exposed by opening the cover 3. Therefore, the CDS 1 of this embodiment can allow the image reading sensor 18 to read the document D only in the state in which the cover 3 is open.

Back key 15a, Home key 15b, and Cancel key 15c are provided as operation keys 15 (see FIG. 4) on the upper surface of the main body unit 2. Back key 15a is the key provided in order that the screen, which is displayed on LCD 16, is switched to the screen previously displayed before the concerning screen, in place of the concerning screen. Home key 15b is the key provided in order to display the home screen to be displayed on LCD 16 in the state in which the cover 3 is open, i.e., the most significant or superordinate screen of the group of screens of the tree structure corresponding to the state of the CDS 1. Cancel key 15c is the key provided in order to cancel any process in execution, for example, the reading process. The user can execute the processes allotted to the respective keys 15a to 15c by appropriately operating the keys 15a to 15c. The keys 15a to 15c are provided at the positions to be covered by the cover 3 when the cover 3 is closed. Therefore, the keys 15a to 15c can be operated only in the state in which the cover 3 is open, and the keys 15a to 15c cannot be operated when the cover 3 is closed.

Figure 3A:
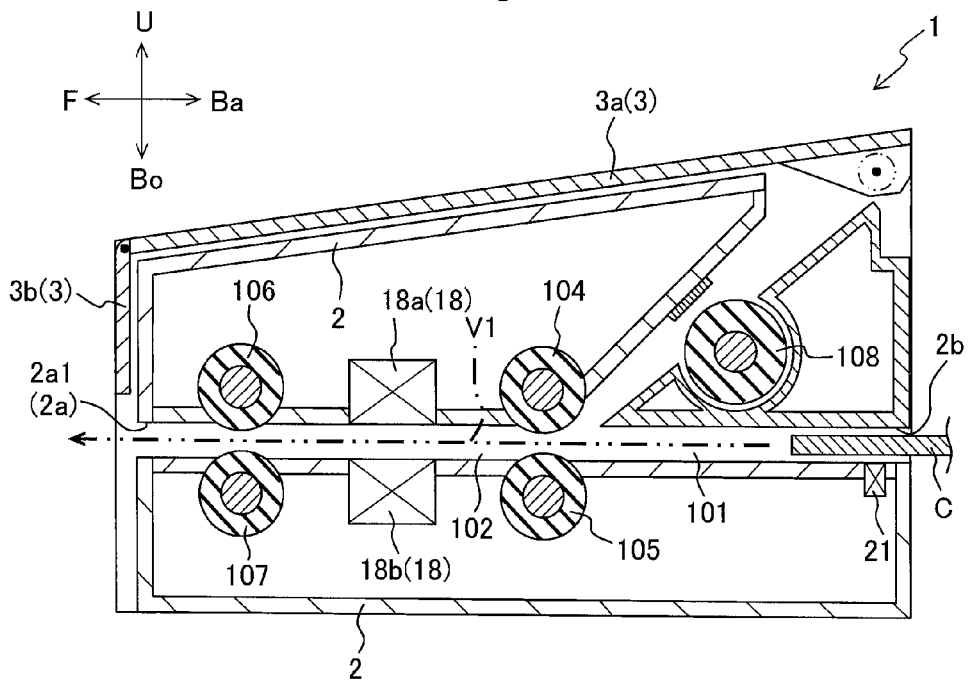
FIGS. 3A and 3B show schematic sectional views illustrating the CDS taken along a line IIIa-IIIa shown in FIG. 1A and a line IIIb-IIIb shown in FIG. 2 respectively.

FIG. 3A shows a sectional view of the CDS 1 in the state in which the cover 3 is closed. the CDS 1 of this embodiment is configured such that the card C inserted from the insertion port 2b can be read in the state in which the cover 3 (3a, 3b) is closed. The main body unit 2 is provided with a route 101 which extends from the insertion port 2b, and a route 102 which is provided in connection with the route 101 and which extends to the discharge port 2a2 (discharge port 2a). A pair of transport rollers 104, 105 are provided rotatably respectively for the route 102 on the side of the route 101 in a state of being brought in contact with each other under pressure.

The transport rollers 104, 105 are rotated by a driving motor 19 (see FIG. 4), and the card C is transported toward the discharge port 2a2 by means of the rotational force. On the other hand, a pair of paper discharge rollers 106, 107 are provided rotatably respectively for the route 102 on the side of the discharge port 2a2 in a state of being brought in contact with each other under pressure. The paper discharge rollers 106, 107 are also rotated by the driving motor 19, and the card C is discharged from the discharge port 2a2 by means of the rotational force. It is also allowable that one of the transport rollers 104, 105 is a driving roller which is rotated by the driving force transmitted from the driving motor 19 and the other is a driven roller which is rotated in accordance with the rotation of the driving roller. The paper discharge rollers 106, 107 may be also constructed in the same manner as described above.

A card detection sensor 21 is provided in the vicinity of the insertion port 2b. When the card C, which is inserted from the insertion port 2b, is detected by the card detection sensor 21 in the state in which the cover 3 is closed, the transport rollers 104, 105 are once stopped in a state in which the card C is interposed (nipped). After that, the transport rollers 104, 105 are rotated again on condition that the instruction to start the reading is inputted. The interposed card C is transported toward the discharge port 2a2. The card C, which is transported by the transport rollers 104, 105, is subsequently interposed by the paper discharge rollers 106, 107, and the card C is discharged from the discharge port 2a2 in accordance with the rotation of the paper discharge rollers 106, 107. the CDS 1 of this embodiment is configured such that the card C is not interposed by the transport rollers 104, 105 when the card C, which is inserted from the insertion port 2b, is detected by the detection sensor 21 in the state in which the cover 3 is open.

The image reading sensor 18, which is capable of reading the image on the surface of the card C allowed to pass through the route 102, is provided between the transport rollers 104, 105 and the paper discharge rollers 106, 107. In this embodiment, as for the image reading sensor 18, there are provided a first image reading sensor 18a which is provided to read the image on one surface (for example, the front surface) of the card C and a second image reading sensor 18b which is provided to read the image on the other surface (for example, the back surface) of the card C. Therefore, the card C, which is inserted from the insertion port 2b, passes through the first route V1 which includes the route 101 and the route 102. At least the image of one of the surfaces is read by the image reading sensor 18 (18a, 18b), and then the card C is discharged from the discharge port 2a2. The first route V1 is formed to be substantially horizontal from the insertion port 2b to the discharge port 2a1. Therefore, even when the card C is thick, the thick card C can be transported smoothly. The manuscript is hardly jammed or clogged.

Figure 3B:
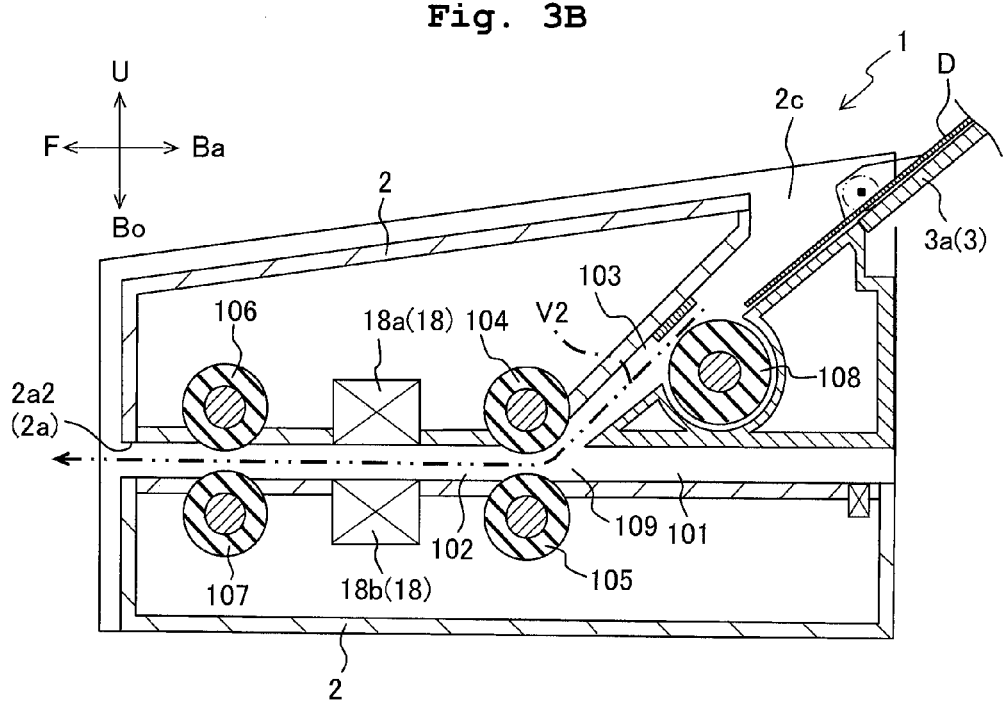

FIG. 3B shows a sectional view of the CDS 1 in the state in which the cover 3 is open. The main body unit 2 is provided with the insertion port 2c in order to insert the document D. The insertion port 2c is exposed and the insertion port 2c can be used when the cover 3 is open. In this way, the CDS 1 of this embodiment is constructed such that the document D inserted from the insertion port 2c can be read in the state in which the cover 3 (3a, 3b) is open. A route 103, which extends from the insertion port 2c, is provided for the main body unit 2, and the route 103 is provided in connection with the route 102. As shown in FIG. 3B, the route 103 for the document and the route 101 for the card described above are merged at a merging portion 109, and they are connected to the route 102 respectively. In other words, the route 102 is the transport route which is commonly used to transport both of the document D and the card C.

The route 103 is provided with a paper feed roller 108. The paper feed roller 108 is rotated by the driving motor 19 (see FIG. 4). The document D, which is set on the cover 3 that functions as the paper feed tray, is guided to the route 103 by means of the rotational force. The document D, which is guided to the paper feed route 103, is interposed by the transport rollers 104, 105, and the document D is transported toward the discharge port 2a2 (discharge port 2a) in accordance with the rotation of the transport rollers 104, 105. Subsequently, the document D, which is transported by the transport rollers 104, 105, is interposed by the paper discharge rollers 106, 107, and the document D is discharged from the discharge port 2a2 in accordance with the rotation of the paper discharge rollers 106, 107. Therefore, the document D, which is inserted from the insertion port 2c, passes through the second route V2 which is composed of the route 103 and the route 102. At least the image of one of the surfaces is read by the image reading sensor 18 (18a, 18b), and then the document D is discharged from the discharge port 2a2.

Figure 4:
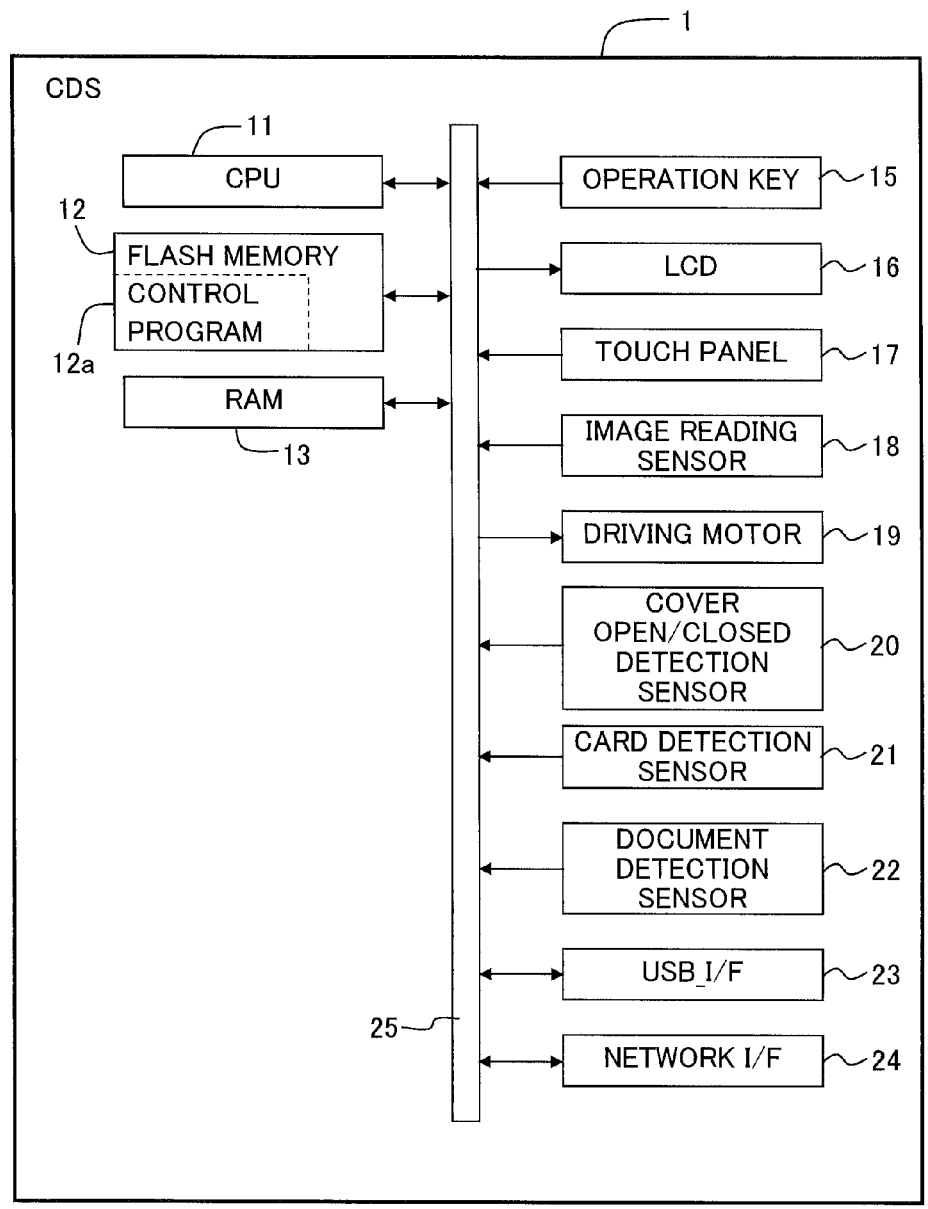
FIG. 4 shows a block diagram illustrating an electric arrangement of the CDS.

As shown in FIG. 4, the CDS 1 is principally provided with a CPU 11, a flash memory 12, a RAM 13, an operation key 15, an LCD 16, a touch panel 17, an image reading sensor 18, a driving motor 19, a cover open/closed detection sensor 20, a card detection sensor 21, a document detection sensor 22, a USB interface (USB_I/F) 23, and a network interface (network I/F) 24. The respective components 11 to 13, 15 to 24 are connected to one another via bus line 25.

Figure 9A:
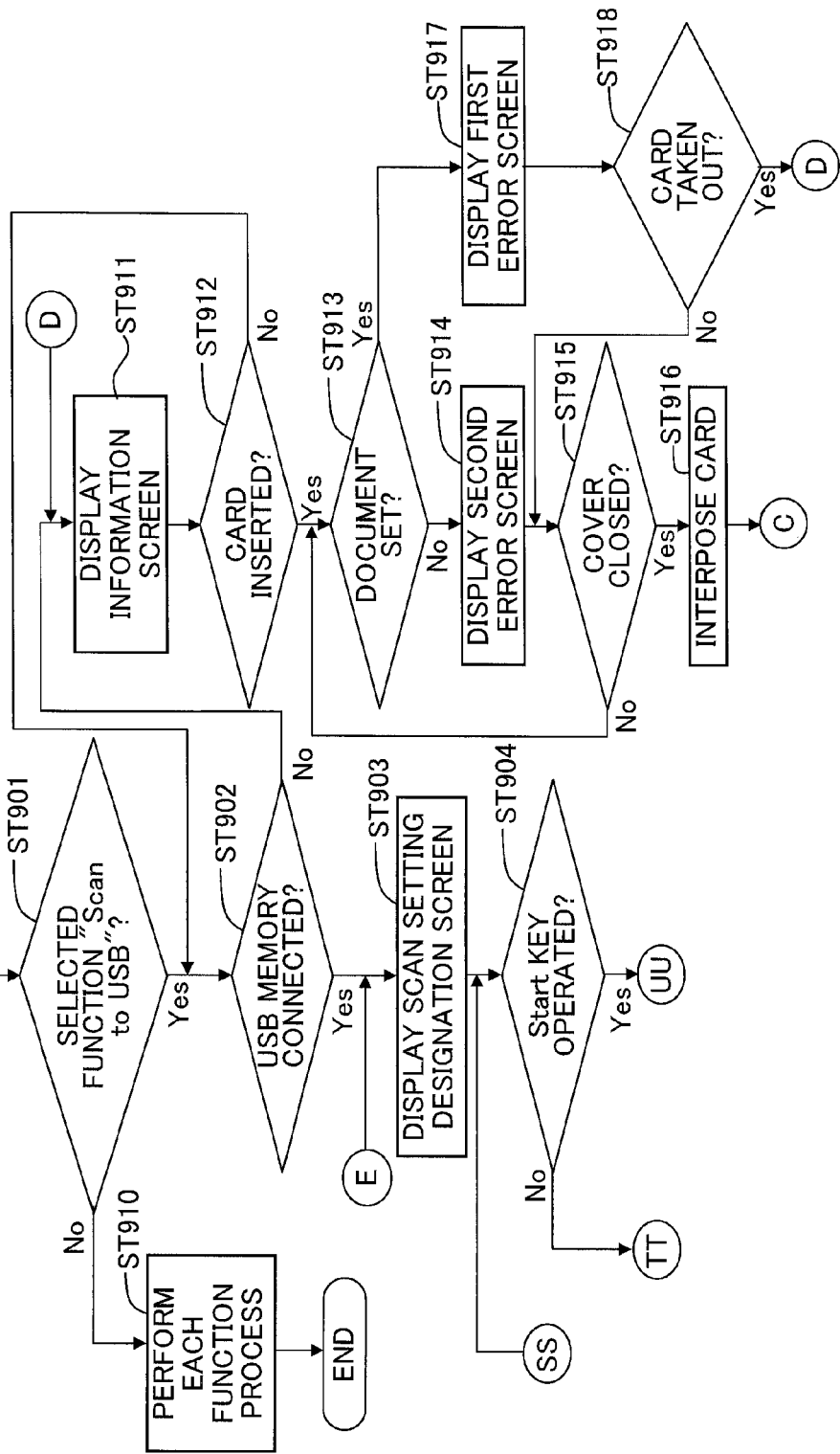
FIGS. 9A and 9B show flow charts illustrating a function execution process.
Figure 9B:
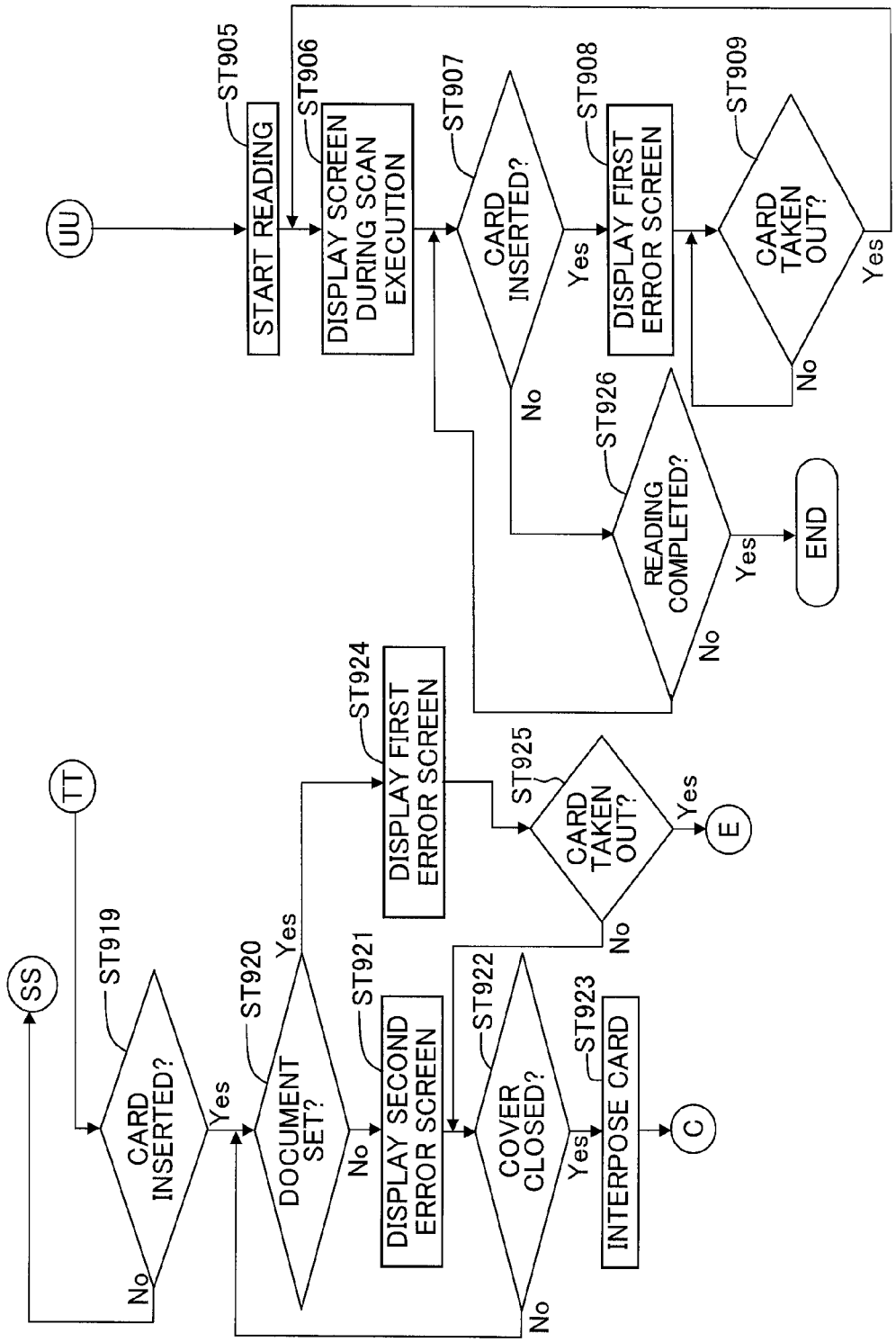

The CPU 11 controls the respective components of the CDS 1 in accordance with fixed values and programs stored in the flash memory 12 and the data stored in RAM 13. The flash memory 12 is a nonvolatile memory, which stores therein, for example, the control program 12a for controlling the operation of the CDS 1 and the reading preset values such as the reading resolution and the like. The display control for the respective screens shown in the screen transition drawings of FIGS. 5 to 7 described later on and the respective processes shown in flow charts of FIGS. 8 and 9 are executed by the CPU 11 in accordance with the control program 12a.

For example, the CPU 11 is constructed as follows. That is, the CPU 11 executes the control in which the card C inserted from the insertion port 2b is interposed between the transport rollers 104, 105 in the state in which the cover 3 is closed, while the CPU 11 does not execute the control in which the card C inserted from the insertion port 2b is interposed between the transport rollers 104, 105 in the state in which the cover 3 is open, in accordance with the control program 12a. Further, the CPU 11 sets the reading mode of the manuscript depending on the open/closed state of the cover 3 in accordance with the control program 12a. Specifically, the CPU 11 sets the reading mode of the manuscript to the card reading mode in which the card C inserted from the insertion port 2b is read, when the cover 3 is closed, while the CPU 11 sets the reading mode of the manuscript to the document reading mode in which the document D inserted from the insertion port 2c is read, when the cover 3 is open.

The RAM 13 is the rewritable volatile memory which temporarily stores the information required for the process performed by the CPU 11. The reading image data obtained by the reading by the image reading sensor 18 is stored in RAM 13. The operation key 15 is the hard key with which, for example, various preset values and instructions are inputted into the CDS 1. The operation key 15 includes Back key 15a, Home key 15b, and Cancel key 15c described above. The LCD 16 is the liquid crystal display apparatus. The touch panel 17 is provided to input, for example, the instruction into the CDS 1 by allowing an instructing member such as a finger or a rod to make contact therewith or approach thereto. The image reading sensor 18 (such as first image reading sensor 18a, second image reading sensor 18b) is the sensor which reads the image by optically detecting the lightness and darkness of the image. Any well-known sensor, which is, for example, a CIS (Contact Image Sensor) or a CCD (Charge Coupled Device), can be adopted as the image reading sensor 18. The driving motor 19 is the motor which applies the driving force for rotating the respective rollers 104 to 108 respectively. The USB_I/F 23 is the device which is provided to connect, for example, a storage medium such as a USB memory or the like and/or any other apparatus such as a personal computer (PC), a hard disk or the like by the aid of a USB plug so that the communication can be performed, and USB_I/F is constructed by any well-known device. The network_I/F 24 is the interface which is provided to connect the CDS 1 to the network (not shown) such as LAN, the internet or the like.

The cover open/closed detection sensor 20 is the sensor which detects the open/closed state of the cover 3. The cover open/closed detection sensor 20 outputs, to the CPU 11, the signal depending on whether the cover 3 is open or closed. The cover open/closed detection sensor 20 output, to the CPU 11, the high signal, for example, when the cover 3 is closed. the CPU 11 judges the open/closed state of the cover 3 on the basis of the signal inputted from the cover open/closed detection sensor 20. Any well-known sensor, which includes, for example, an optical sensor, a contact sensor, and a magnetic sensor, can be adopted as the cover open/closed detection sensor 20. The card detection sensor 21 is the sensor which detects the card C inserted or set into the insertion port 2b. Any well-known sensor, which includes, for example, an optical sensor, can be adopted as the card detection sensor 21. The card detection sensor 21 outputs, to the CPU 11, the detection signal which is switched from the low to the high, for example, when it is detected that the card C is inserted into the insertion port 2b. the CPU 11 judges whether or not the card C is inserted into the insertion port 2b, on the basis of the signal inputted from the card detection sensor 21. The document detection sensor 22 is the sensor which detects the document D set or placed on the paper feed tray composed of the open cover 3. Any well-known sensor, which includes, for example, a contact sensor, can be adopted as the document detection sensor 22. The document detection sensor 22 outputs, to the CPU 11, the high signal, for example, when the document D is set on the paper feed tray. The CPU 11 judges whether or not the document D is set on the paper feed tray on the basis of the signal inputted from the document detection sensor 22.

The CDS 1 of this embodiment is constructed such that the card C, which is inserted into the insertion port 2b, is interposed (nipped) by the transport rollers 104, 105 on condition that the reading mode is the card reading mode. Therefore, even when the card C is inserted into the insertion port 2b in the state in which the cover 3 is open, the concerning card C is not interposed by the transport rollers 104, 105. Further, the CDS 1 starts the reading function for reading the card C by using the trigger of the fact that the card C is detected by the card detection sensor 21 when the reading mode is the card reading mode. The reading function, which is started as described above, is completed when the reading of the card C is completed and the card C is discharged from the discharge port 2a1, or when the reading mode is changed to the document reading mode in accordance with the fact that the cover 3 is opened. Further, the CDS 1 transports the card C interposed by the transport rollers 104, 105 to the downstream side, i.e., toward the discharge port 2a1 along the first route V1, on condition that the cover 3 is closed. Therefore, when the cover 3 is opened even after the reading function for reading the card C is started, the card C, which is interposed by the transport rollers 104, 105, cannot be transported.

On the other hand, the CDS 1 of this embodiment starts the reading of the document D when an operation key (not shown), which is provided to instruct the execution of the reading of the document D by the image reading sensor 18, is operated on condition that the reading mode is the document reading mode, and the document D, which is set on the paper feed tray, is transported to the downstream side, i.e., toward the discharge port 2a2 along the second route V2. As described above, the card C is not interposed by the transport rollers 104, 105 even when the card C is inserted into the insertion port 2b in the state in which the cover 3 is open. Even when the card C is interposed by the transport rollers 104, 105, the card C is not transported. Therefore, the manuscript jamming, which would be otherwise caused by the card C and the document D at the merging portion 109, is avoided in the state in which the cover 3 is open.

Figure 5:
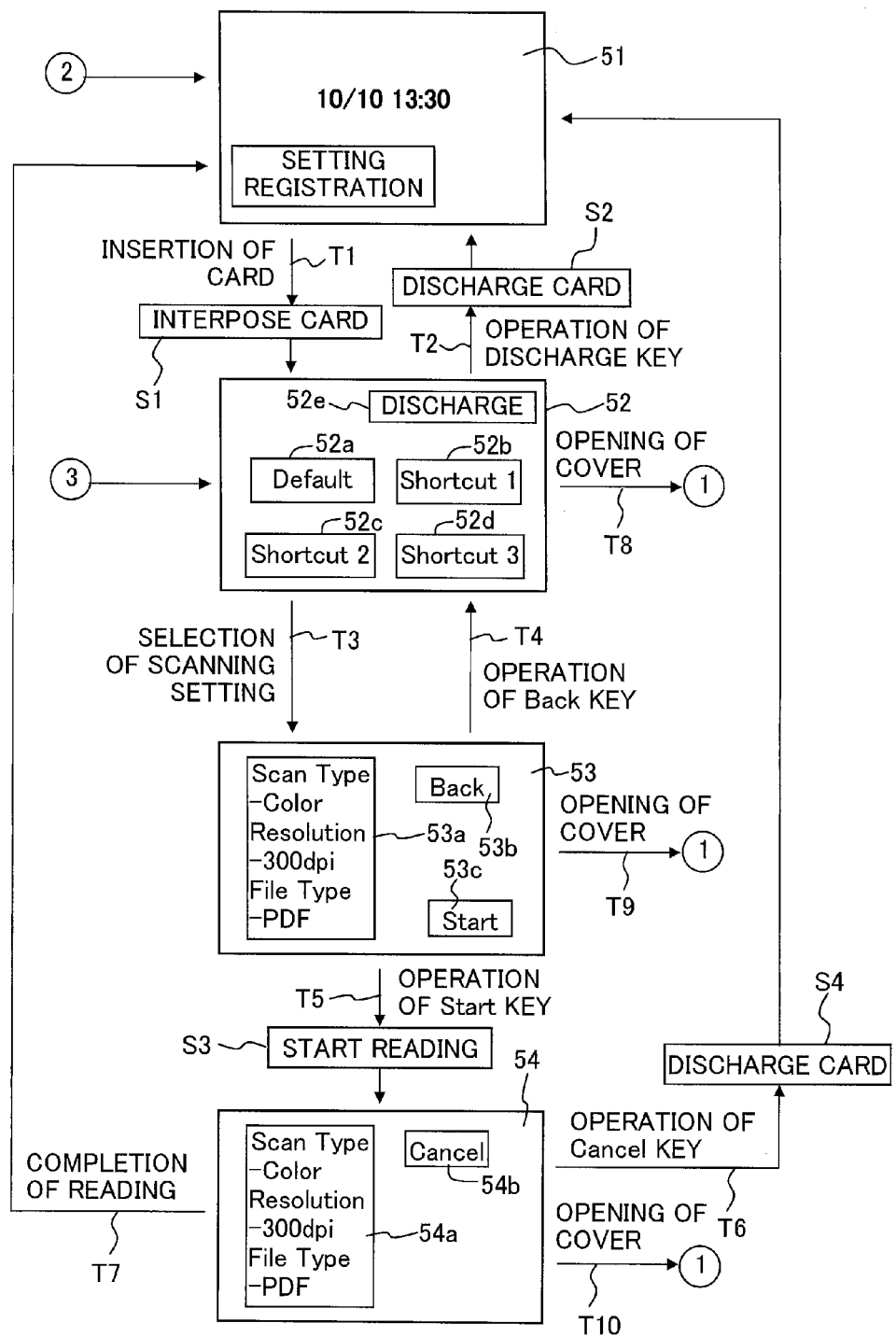
FIG. 5 shows an example of the screen transition of screens displayed on LCD of the CDS.
Figure 6:
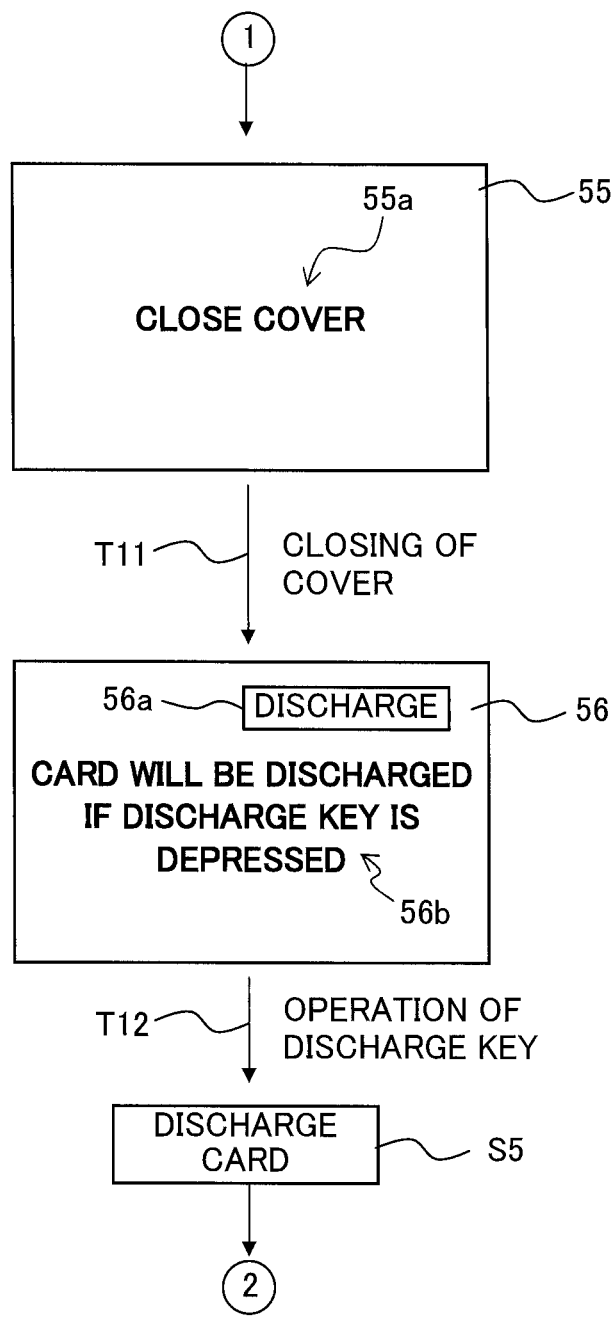
FIG. 6 shows an example of the screen transition of screens displayed on LCD of the CDS.

The processes, which are executed in accordance with the transition of the screens by the CPU 11, are shown in FIGS. 5 and 6, if necessary. When the cover 3 is closed, and the manuscript reading mode is set to the card reading mode, then the CPU 11 allows the LCD 16 to display a waiting screen 51 in the card reading mode. When the CPU 11 judges that the card C is inserted into the insertion port 2b on the basis of the signal inputted from the card detection sensor 21 in the state in which the waiting screen 51 is displayed (T1), then the CPU 11 operates the driving motor 19, and the inserted card C is stopped in the state in which the card C is interposed between the transport rollers 104, 105 (S1). As described above, the reading function for reading the card C is started by using the trigger of the fact that the insertion of the card C is detected by the card detection sensor 21 in the card reading mode. Therefore, the CPU 11 allows the LCD 16 to display a scan setting designation screen 52 in place of the waiting screen 51 after performing the process of S1.

The scan setting designation screen 52 is the screen which allows the user to designate the reading preset value concerning the reading of the card C by the image reading sensor 18. A default key 52a and three shortcut keys 52b to 52d are displayed on the scan setting designation screen 52. The default key 52a and the shortcut keys 52b to 52d are the soft keys for which it is possible to designate the scan setting as composed of a combination of a plurality of reading preset values respectively. When the CPU 11 accepts the input operation (touch in this embodiment) with respect to one key of the default key 52a and the shortcut keys 52b to 52d in accordance with the control program 12a, the CPU 11 designates the scan setting, i.e., the combination of the plurality of reading preset values. Therefore, the user can easily designate the scan setting by touching any one of the default key 52a and the shortcut keys 52b to 52d. In this embodiment, it is assumed that the scan setting is constructed by the preset value (Scan Type) to indicate whether the reading is performed in the color mode or in the monochrome or black and white mode, the preset value (Resolution) to indicate the reading resolution, and the preset value (File Type) to indicate the file format generated from the read image data. However, the scan setting, which can be designated by each of the keys 52a to 52d, is not limited to the combination of the reading preset values as described above.

The default scan setting is allowed to correspond to the default key 52a. On the other hand, the scan settings, which are arbitrarily set by the user, are allowed to correspond to the shortcut keys 52b to 52d. When the CPU 11 detects the touch with respect to the key of the default key 52a or the shortcut keys 52b to 52d to which the scan setting is allowed to correspond (T3), the CPU 11 allows the LCD 16 to display a screen before scan execution 53 in place of the scan setting designation screen 52.

A discharge key 52e is displayed on the scan setting designation screen 52. The discharge key 52e is the soft key which is provided in order to instruct that the card C, which is interposed between the transport rollers 104, 105, is discharged without performing the reading by the image reading sensor 18. When the CPU 11 detects the touch to the discharge key 52e (T2), the CPU 11 operates the driving motor 19 so that the card C, which is interposed between the transport rollers 104, 105, is transported to the downstream side, and the card C is discharged from the discharge port 2a1 by using the paper discharge rollers 106, 107 (S2).

As described above, the CDS 1 of this embodiment is configured such that the card C is interposed (nipped) between the transport rollers 104, 105 when the insertion of the card C is detected by the card detection sensor 21. In this situation, the transport rollers 104, 105 are brought in contact with the card C so that the transport rollers 104, 105 make tight contact therewith. Therefore, when the card C is forcibly pulled out in the state in which the card C is interposed between the transport rollers 104, 105, there is such a possibility that the card C may be damaged. On the contrary, according to the CDS 1 of this embodiment, the discharge key 52e is displayed in the scan setting designation screen 52. Therefore, the user can discharge the card C by using the discharge key 52e even after the card C is interposed between the transport rollers 104, 105.

When the CPU 11 judges that the card C is discharged from the insertion port 2b after performing the process of S2, the CPU 11 allows the LCD 16 to display the waiting screen 51 in place of the scan setting designation screen 52. Therefore, the screen returns to the screen (waiting screen 51) in which the insertion of the card C is not detected, after discharging the card C. Therefore, when the card C is inserted in succession, it is possible to read the concerning card C.

The screen before scan execution 53 is the screen which is provided in order that the scan setting designated by the user is confirmed by the user. A display area 53a is provided for the screen before scan execution 53. The display area 53a displays the contents of the scan setting allowed to correspond to the key operated in the opportunity to display the screen before scan execution 53, of the default key 52a and the shortcut keys 52b to 52d, i.e., the scan setting designated by the user. The Back key 53b and the Start key 53c are displayed on the screen before scan execution 53. The Back key 53b is the soft key which is provided in order to instruct that the scan setting designation screen 52 as the previous screen is displayed in place of the screen which is being displayed (screen before scan execution 53). When the CPU 11 detects the touch to Back key 53b (T4), the CPU 11 allows the LCD 16 to display the scan setting designation screen 52 in place of the screen before scan execution 53. On the other hand, the Start key 53c is the soft key which is provided in order to instruct the execution of the reading of the card C by the image reading sensor 18. When the CPU 11 detects the touch to Start key 53c (T5), the CPU 11 operates the driving motor 19 so that the card C, which is interposed between the transport rollers 104, 105, is transported to the downstream side, and the reading of the card C by the image reading sensor 18 is started (S3). the CPU 11 allows LCD 16 to display a screen during scan execution 54 in place of the screen before scan execution 52 in accordance with the execution of the process of S3.

Therefore, the user can starts the reading of the card C by touching the Start key 53c after confirming whether or not the scan setting displayed in the display area 53a is the desired setting. On the other hand, when the scan setting displayed in the display area 53a is not the desired setting, the user can display the scan setting designation screen 52 again by touching the Back key 53b. Therefore, the designation of the scan setting can be changed if desired. In this situation, the card C is maintained in the state of being interposed between the transport rollers 104, 105, and the card C is not discharged. Therefore, it is also unnecessary to insert the card C again. The reading of the card C can be efficiently performed in accordance with the desired scan setting. Any key, which functions in the same manner as the discharge key 52e, is not displayed on the screen before scan execution 53. Therefore, it is possible to avoid any erroneous discharge of the card C. On the other hand, the construction is made such that any key, which functions in the same manner as the Start key 53c, is not displayed on the scan setting designation screen 52. Therefore, it is possible to avoid the execution of the reading of the card C with the scan setting which is not intended by the user.

The screen during scan execution 54 is the screen which is displayed during the execution of the reading of the card C. The screen during scan execution 54 is provided with a display area 54a. The display area 54a displays the contents of the scan setting set for the reading which is being executed, i.e., the scan setting having been displayed in the display area 53a. The Cancel key 54b is displayed on the screen during scan execution 54. The Cancel key 54b is the soft key which is provided in order to instruct the stop (cancel) of the reading which is being executed. When the CPU 11 detects the touch to the Cancel key 54b (T6), the CPU 11 allows the card C to be discharged from the discharge port 2a1 without completing the reading of the card C by the image reading sensor 18 (S4). In other words, the CPU 11 interrupts or discontinues the reading of the card C by the image reading sensor 18, and the card C is discharged from the discharge port 2a1. Therefore, even when the card C is being read, it is possible to discharge the card C by stopping the reading, because the Cancel key 54b is displayed on the screen during scan execution 54. Further, it is possible to discharge the card C without performing the reading even before the reading of the card C is started by the image reading sensor 18 after touching Start key 53c. It is intended that the phrase "without completing the reading of the card C by the image reading sensor 18" includes both of the case in which the reading is stopped and the card C is discharged even when the card C is being read and the case in which the card C is discharged without performing the reading even before the reading of the card C is started.

When the CPU 11 judges that the card C is discharged from the insertion port 2b after performing the process of S4, the CPU 11 allows the LCD 16 to display the waiting screen 51 in place of the screen during scan execution 54. Therefore, the screen returns to the screen (waiting screen 51) in the state in which the insertion of the card C is not detected after the reading of the card C is stopped and the card C is discharged. Therefore, when the card C is inserted in succession, it is possible to perform the reading of the card C. On the other hand, when the reading, which is executed on the basis of the touch to the Start key 53c, is completed (T7), the CPU 11 allows the LCD 16 to display the waiting screen 51 in place of the screen during scan execution 54.

When the CPU 11 judges that the cover is opened (T8, T9, T10) on the basis of the signal inputted from the cover open/closed detection sensor 20 in the state in which any one of the screens of the scan setting designation screen 52, the screen before scan execution 53, and the screen during scan execution 54 is displayed on the LCD 16, the CPU 11 allows the LCD 16 to display an information screen 55. In other words, the information screen 55 is displayed on the LCD 16 when the cover 3 is opened when the screen 52, 53, 54 is displayed on the LCD 16 after the card C is interposed between the transport rollers 104, 105 and the reading function for reading the card C is started. The information screen 55 is the screen on which a message to suggest the closing of the cover 3, for example, a message 55a of "close cover" is displayed. As described above, the CDS 1 of this embodiment is constructed such that the card C, which is interposed between the transport rollers 104, 105, is transported to the downstream side on condition that the cover 3 is closed. Therefore, when the cover 3 is opened after the reading function for reading the card C is started, then the card C, which is disposed on the first route V1, cannot be transported. On the other hand, the CDS 1 of this embodiment displays the information screen 55 including the message 55a to suggest the closing of the cover 3, when the cover 3 is opened after the reading function for reading the card C is started. Therefore, the user can recognize the necessity to close the cover 3.

When the CPU 11 judges that the cover 3 is closed in the state in which the information screen 55 is displayed on the LCD 16 (T11), the CPU 11 allows the LCD 16 to display a discharge execution screen 56. A discharge key 56a and a message 56b to prompt the operation of the discharge key 56a are displayed on the discharge execution screen 56. The discharge key 56a is the soft key which is provided in order to instruct the discharge of the card C interposed between the transport rollers 104, 105 without performing the reading by the image reading sensor 18, in the same manner as the discharge key 52e of the scan setting designation screen 52. When the CPU 11 detects the touch to the discharge key 56a (T12), the CPU 11 allows the card C interposed between the transport rollers 104, 105 to be discharged from the discharge port 2a1 (S5), in the same manner as in the process of S2 described above. Therefore, the discharge execution screen 56, which is displayed on the LCD 16 on condition that the cover 3 is closed, includes the discharge key 56a, even when the cover 3 is opened after the reading function for reading the card C is started. Therefore, when the discharge key 56a is used, it is possible to discharge the card C interposed between the transport rollers 104, 105. Accordingly, the card C, which is interposed between the transport rollers 104, 105, can be discharged without forcibly pulling out the card C. Therefore, it is possible to prevent the card C from being damaged.

When the CPU 11 judges that the card C is discharged from the insertion port 2b after performing the process of S5, the CPU 11 allows the LCD 16 to display the waiting screen 51 in place of the discharge execution screen 56. For example, when the CPU 11 judges that the card C is not detected by the card detection sensor 21, or when the CPU 11 detects the touch to the discharge key 56a, then the CPU 11 judges that the card C is discharged from the insertion port 2b. As described above, the reading function for reading the card C is canceled by opening the cover 3. However, the screen returns to the screen (waiting screen 51) in the state in which the insertion of the card C is not detected, after discharging the card C. Therefore, when the card C is inserted in succession, it is possible to read the concerning card C.

Figure 7:
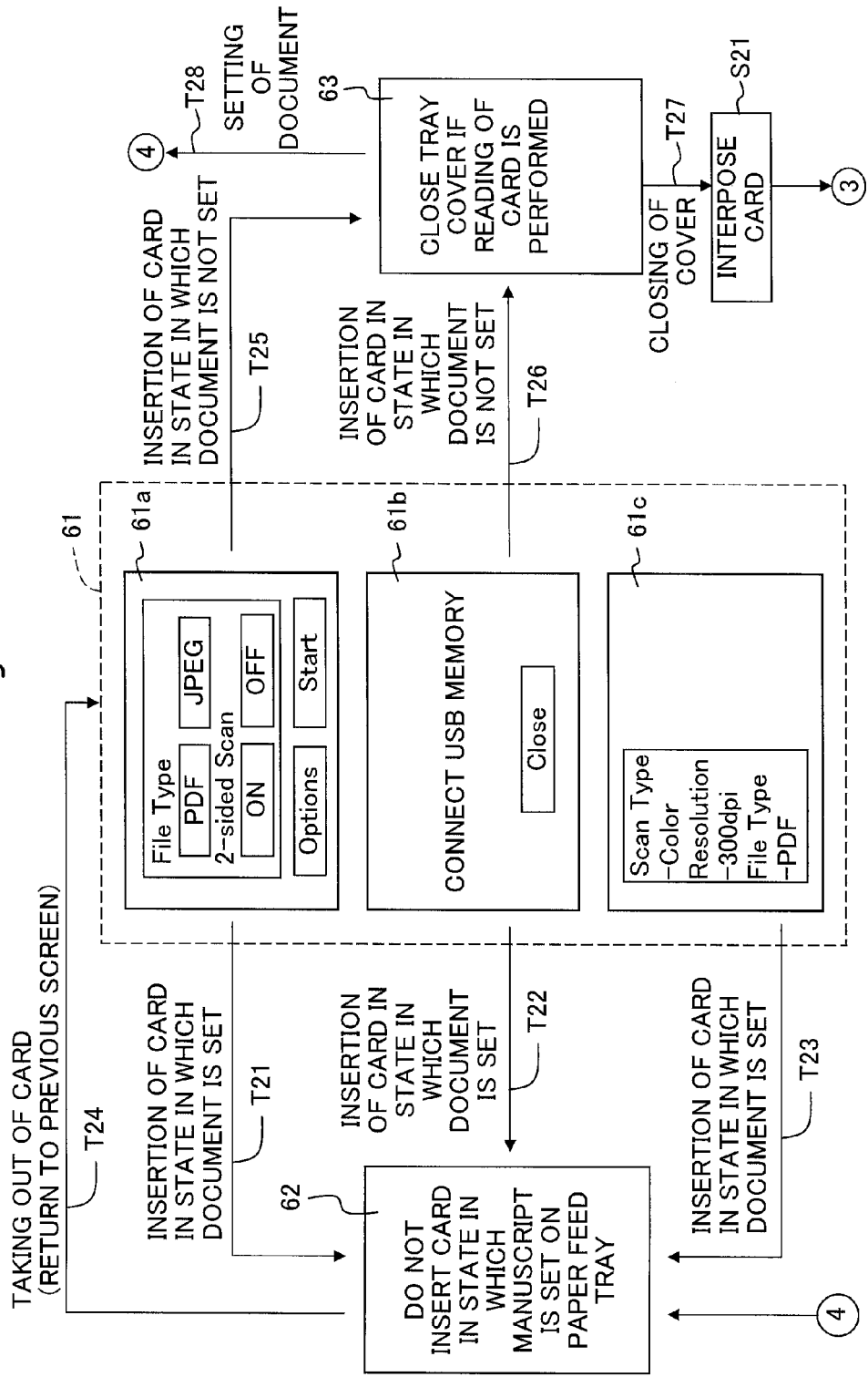
FIG. 7 shows an example of the screen transition of screens displayed on LCD of the CDS.

FIG. 7 shows the processes to be executed by the CPU 11 in accordance with the transition of the screens, if necessary. When the cover 3 is opened, and the reading mode for reading the manuscript is set to the document reading mode, then the CPU 11 allows the LCD 16 to display the screen corresponding to the situation, of the group of screens 61 concerning the document reading mode. The group of screens 61 include, for example, a screen 61a which is provided to allow the user to designate the reading preset values concerning the reading of the document D by the image reading sensor 18, a screen 61b on which the message corresponding to the situation is displayed, and a screen 61c which is displayed during the execution of the reading of the document D by the image reading sensor 18.

For example, the screens 61a to 61c of the group of screens 61 are the screens which may be displayed on the LCD 16 in the state in which the document D is set on the paper feed tray composed of the open cover 3. When the CPU 11 judges that the card C is inserted into the insertion port 2b in the state in which the document D is set on the paper feed tray during the display of the screens 61a to 61c as described above (T21, T22, T23), the CPU 11 allows the LCD 16 to display an error screen 62. The error screen 62 is the screen on which, for example, an error message of "Do not insert card in state in which manuscript is set on paper feed tray" is displayed. Therefore, the user can recognize that the insertion of the card C, which is performed in the state in which the cover 3 is open and the document is set, is an error, on the basis of the error screen 62.

As described above, even when the user erroneously inserts the card C into the insertion port 2b in the state in which the reading mode is set to the document reading mode, the card C is not interposed between the transport rollers 104, 105. In other words, even when the CPU 11 judges that the card C is inserted into the insertion port 2b in T21, T22, T23, the card C is not interposed between the transport rollers 104, 105. In such a situation, the user can take out the card C without damaging the card C by pulling out the card C from the insertion port 2b.

When the CPU 11 judges that the card C is taken out of the insertion port 2b on the basis of the signal inputted from the card detection sensor 21 in the state in which the error screen 62 is displayed on the LCD 16 (T24), the CPU 11 allows the LCD 16 to display the screen provided just before the display of the error screen 62, of the group of screens 61, in place of the error screen 62. When the card C is pulled out, the screen, which is provided just before the display of the error screen 62, is displayed. Therefore, the reading operation for reading the document D can be continued from the state provided just before the insertion of the card C into the insertion port 2b. For example, when the screen provided just before is the screen 61c, then the CPU 11 operates the driving motor 19 to restart the transport of the document D, and the reading of the document D by the image reading sensor 18, which is interrupted, is restarted. On the other hand, when the screen provided just before is the screen such as the screens 61a, 61b to be displayed before the execution of the reading of the document D by the image reading sensor 18, then the CPU 11 allows the document D set on the tray to be interposed between the transport rollers 104, 105 and transported thereby so that the image is read by the image reading sensor 18, when the CPU 11 accepts the operation of the operation key (not shown) which is provided in order to instruct the execution of the reading of the document D.

For example, the screens 61a, 61b, which are included in the group of screens 61 concerning the document reading mode, are the screens which may be displayed on the LCD 16 even in such a state that the document D is not set on the paper feed tray composed of the open cover 3. When the CPU 11 judges that the card C is inserted into the insertion port 2b in the state in which the document D is not set on the paper feed tray during the display of the screen 61a, 61b as described above (T25, T26), the CPU 11 allows the LCD 16 to display an error screen 63. Such a situation also resides in the insertion of the card C in the state in which the cover 3 is open. Therefore, the inserted card C is not interposed between the transport rollers 104, 105. The error screen 63 is the screen on which, for example, an error message of "close tray cover when reading of card is performed" is displayed. Therefore, the user can recognize that the insertion of the card C in the state in which the cover 3 is open is the error, on the basis of the error screen 63.

When the CPU 11 judges that the cover is closed in the state in which the error screen 63 is displayed on the LCD 16 (T27), the CPU 11 allows the inserted card C to be stopped in the state of being interposed between the transport rollers 104, 105 (S21) in the same manner as in the process of S2 described above. the CPU 11 allows the LCD 16 to display the scan setting designation screen 52 in place of the error screen 63 after performing the process of S21. Therefore, even when the card C is inserted into the insertion port 2*b* in the state in which the reading mode is not set to the card reading mode but the reading mode is set to the document reading mode, it is possible to perform the reading of the card C by means of the image reading sensor 18 by closing the cover 3. On the other hand, when the CPU 11 judges that the document D is set on the paper feed tray on the basis of the signal inputted from the document detection sensor 22 in the state in which the error screen 63 is displayed on the LCD 16 (T28), the CPU 11 allows the LCD 16 to display the error screen 62 in place of the error screen 63.

FIG. 8 shows a flow chart illustrating the card reading process. This process is started when the CPU 11 judges that the cover 3 is closed. At first, the CPU 11 allows the LCD 16 to display the waiting screen 51 in the card reading mode (ST801). Subsequently, when the CPU 11 judges that the card C is inserted into the insertion port 2*b* on the basis of the signal inputted from the card detection sensor 21 (ST802: Yes/corresponding to T1 described above), the CPU 11 transports the card C to stop the card C in the state of being interposed between the transport rollers 104, 105 (ST803/corresponding to S1 described above). On the other hand, when the CPU 11 judges that the card C is not inserted into the insertion port 2*b* (ST802: No), the CPU 11 waits until the insertion of the card C is detected by the card detection sensor 21.

the CPU 11 allows the LCD 16 to display the scan setting designation screen 52 in place of the waiting screen 51 (ST840) after the process of ST803. Subsequently, when the CPU 11 detects the touch to each of the keys 52*a* to 52*d* displayed on the scan setting designation screen 52 (ST805: Yes/corresponding to T3 described above), the CPU 11 allows the LCD 16 to display the screen before scan execution 53 in place of the scan setting designation screen 52 (ST806). On the other hand, when the CPU 11 detects the touch to the discharge key 52*e* displayed on the scan setting designation screen 52 (ST805: No, ST818: Yes/corresponding to T2 described above), then the CPU 11 allows the card C interposed between the transport rollers 104, 105 to be discharged from the discharge port 2*a*1 (ST819/corresponding to S2 described above), and the process proceeds to ST801. Accordingly, the waiting screen 51 is displayed on the LCD 16 in place of the scan setting designation screen 52.

When the CPU 11 judges that the cover 3 is opened during the display of the scan setting designation screen 52 (ST818: No, ST820: Yes/corresponding to T8 described above), the CPU 11 allows the LCD 16 to display the information screen 55 which includes the message 55*a* to suggest the closing of the cover 3 in place of the scan setting designation screen 52 (ST813). On the other hand, when the cover 3 is still closed in ST820 (ST820: No), the CPU 11 allows the process to proceed to ST805. In such a situation, the scan setting designation screen 52 is successively displayed on the LCD 16.

When the CPU 11 detects the touch to Start key 53*c* displayed on the screen before scan execution 53 (ST807: Yes/corresponding to T5 described above), then the CPU 11 transports the card C to start the reading of the card C by the image reading sensor 18 (ST808/corresponding to S3 described above), and the CPU 11 allows the LCD 16 to display the screen during scan execution 54 in place of the screen before scan execution 53 (ST809). On the other hand, when the CPU 11 detects the touch to Back key 53*b* displayed on the screen 53 before scan execution 53 (ST807: No, ST821: Yes/corresponding to T4 described above), the CPU 11 allows the process to proceed to ST804. Accordingly, the scan setting designation screen 52 as the previous screen is displayed on the LCD 16 in place of the screen before scan execution 53.

When the CPU 11 judges that the cover 3 is opened during the display of the screen before scan execution 53 (ST821: No, ST822: Yes/corresponding to T9 described above), the CPU 11 allows the LCD 16 to display the information screen 55 which includes the message 55*a* to suggest the closing of the cover 3 in place of the screen before scan execution 53 (ST813). On the other hand, when the cover 3 is still closed in ST822 (ST822: No), the CPU 11 allows the process to proceed to ST807. In such a situation, the screen before scan execution 53 is successively displayed on the LCD 16.

When the CPU 11 detects the touch to Cancel key 54*b* displayed on the screen during scan execution 54 (ST 810: Yes/corresponding to T6 described above), then the CPU 11 allows the card C interposed between the transport rollers 104, 105 to be discharged from the discharge port 2*a*1 (ST819/corresponding to S4 described above), and the CPU 11 allows the process to proceeds to ST801. Accordingly, the waiting screen 51 is displayed on the LCD 16 in place of the scan setting designation screen 52. On the other hand, when the reading of the card C which is being executed is completed without toughing Cancel key 54*b* displayed on the screen during scan execution 54 (ST810: No, ST811: Yes/corresponding to T7 described above), the CPU 11 allows the process to proceed to ST801. Also in such a situation, the waiting screen 51 is displayed on the LCD 16 in place of the scan setting designation screen 52.

When the CPU 11 judges that the cover 3 is opened during the execution of the reading of the card C (ST811: No, ST812: Yes/corresponding to T10 described above), the CPU 11 allows the LCD 16 to display the information screen 55 which includes the message 55*a* to suggest the closing of the cover 3 in place of the screen during scan execution 54 (ST813). When the information screen 55 is displayed during the execution of the reading of the card C, then the reading of the card C by the image reading sensor 18 is interrupted, and the driving motor 19 is stopped to stop the transport of the card C. On the other hand, when the cover 3 is still closed in ST812 (ST812: No), the CPU 11 allows the process to proceed to ST810. In such a situation, the screen during scan execution 54 is successively displayed on the LCD 16.

When the CPU 11 judges that the cover 3 is closed in the state in which the information screen 55 is displayed (ST814: Yes/corresponding to T11 described above), the CPU 11 allows the LCD 16 to display the discharge execution screen 56 in place of the information screen 55 (ST815). On the other hand, when the cover 3 is still open in ST814 (ST814: No), the CPU 11 waits until the cover 3 is closed. In such a situation, the information screen 55, which includes the message 55*a* to suggest the closing of the cover 3, is successively displayed on the LCD 16. On the other hand, when the CPU 11 detects the touch to the discharge key 56*a* displayed on the discharge execution screen 56 (ST816: Yes/corresponding to T12 described above), then the CPU 11 allows the card C interposed between the transport rollers 104, 105 to be discharged from the discharge port 2*a*1 (ST817/corresponding to S5 described above), and the CPU 11 allows the process to proceed to ST801. Accordingly, the waiting screen 51 is displayed on the LCD 16 in place of the discharge execution screen 56. On the other hand, when the discharge head 56*a* displayed on the discharge execution screen 56 is not touched in ST816 (ST816: No), the CPU 11 waits until the discharge key 56*a* is touched. In such a situation, the discharge execution screen 56 is successively displayed on the LCD 16.

This process is started when the function, which is selectable from the waiting screen and which relates to the reading of the document, is selected in the state in which the cover 3 is open and the waiting screen (not shown) in the document reading mode is displayed on the LCD 16. The function, which relates to the reading of the document, includes, for example, the function in which the document reading data is stored in a USB memory (not shown) connected to the USB_I/F 23 (hereinafter referred to as "Scan to USB") and the function in which the document reading data is stored in an FTP server on the network (not shown) connected via the network_I/F 24.

When the selected function is any function other than "Scan to USB" (ST901: No), then the CPU 11 executes the process corresponding to the selected function (ST910), and this process is completed. On the other hand, when the selected function is "Scan to USB", and the USB memory is connected to the USB_I/F 23 (ST901: Yes, ST901: Yes), then the CPU 11 allows the LCD 16 to display the scan setting designation screen in place of the waiting screen which is being displayed (ST903). In this embodiment, the scan setting screen is the screen 61*a* shown in FIG. 7. When the selected function is "Scan to USB", but the USB memory is not connected to the USB_I/F 23 (ST902: No), then the CPU 11 allows the LCD 16 to display the information screen which displays the message to prompt the connection of the USB memory in place of the waiting screen which is being displayed (ST911). In this embodiment, the information screen, which displays the message to prompt the connection of the USB memory, is the screen 61*b* shown in FIG. 7.

When the CPU 11 detects the touch to Start key displayed on the scan setting designation screen (screen 61*a*) (ST904: Yes), the CPU 11 allows the document D set on the paper feed tray (cover 3) to be transported so that the reading of the document D is started by the image reading sensor 18 (ST905). Subsequently, the CPU 11 allows the LCD 16 to display the screen during scan execution in place of the scan setting designation screen. In this embodiment, the screen during scan execution is the screen 61*c* shown in FIG. 7.

When the CPU 11 judges that the card C is not inserted into the insertion port 2*b* during the display of the scan setting designation screen (ST919: No), the CPU 11 allows the process to return to ST904. In such a situation, the scan setting designation screen (screen 61*a*) is successively displayed on the LCD 16. On the other hand, when the CPU 11 judges that the card C is inserted into the insertion port 2*b* on the basis of the signal inputted from the card detection sensor 21 and the CPU judges that the document D is set on the paper feed tray on the basis of the signal inputted from the document detection sensor 22 (ST919: Yes, ST920: Yes/corresponding to T21 described above), then the CPU 11 allows the LCD 16 to display the first error screen in place of the scan setting designation screen (ST924). In this embodiment, the first error screen is the screen 62 shown in FIG. 7. A message which notifies the occurrence of the error due to the setting of both of the manuscript and the card, for example, a message of "Do not insert card in state in which manuscript is set on paper feed tray" is displayed on the first error screen.

When the CPU 11 judges that the card C is taken out of the insertion port 2*b* on the basis of the signal inputted from the card detection sensor 21 during the display of the first error screen (screen 62) (ST925: Yes/corresponding to T24 described above), the CPU 11 allows the process to proceed to ST903. Accordingly, the scan setting designation screen (screen 61*a*) is displayed on the LCD 16 in place of the first error screen. On the other hand, when the CPU 11 judges that the card C is not taken out of the insertion port 2*b* (ST925: No), the CPU 11 judges whether or not the document D is taken out of the paper feed tray and the cover is closed (ST922). When the CPU 11 judges that the cover 3 is closed during the display of the first error screen (screen 62) (ST922: Yes), then the CPU 11 transports the card C to stop the card C in the state in which the card C is interposed between the transport rollers 104, 105 (ST925), and the CPU 11 allows the process to proceed to ST804 (see FIG. 8). On the other hand, when the CPU 11 judges that the cover 3 is not closed in the state in which the first error screen is displayed (ST922: No), the CPU 11 allows the process to proceed to ST920.

When the CPU 11 judges in ST919 and ST920 that the card C is inserted into the insertion port 2*b* but the document D is not set on the paper feed tray (ST919: Yes, ST920: No/corresponding to T25 described above), the CPU 11 allows the LCD 16 to display the second error screen in place of the scan setting designation screen (ST921). In this embodiment, the second error screen is the screen 63 shown in FIG. 7. A message which prompts the closing of the tray cover, for example, "Close tray cover if reading of card is performed" is displayed on the second error screen. When the CPU 11 judges that the cover 3 is closed during the display of the second error screen (screen 63) (ST922: Yes/corresponding to T27 described above), the CPU 11 transports the card C to stop the card C in the state in which the card C is interposed between the transport rollers 104, 105 (ST923/corresponding to S21 described above). Subsequently, the CPU 11 allows the process to proceed to ST 804 (see FIG. 8). Accordingly, the scan setting designation screen 52, which is one of the screens concerning the reading of the card C, is displayed on the LCD 11 in place of the second error screen (screen 63). On the other hand, when the CPU 11 judges that the cover 3 is not closed in the state in which the second error screen is displayed (ST922: No), the CPU 11 allows the process to proceed to ST920. When the CPU 11 judges that the document D is set on the paper feed tray composed of the cover 3 which is open in ST922 (ST920: Yes/corresponding to T28 described above), the CPU 11 allows the LCD 16 to display the first error screen (screen 62) in place of the second error screen (screen 63) (ST924).

When the CPU 11 judges that the card C is not inserted into the insertion port 2*b* during the display of the information screen (screen 61*b*) (ST912: No), the CPU 11 allows the process to return to ST902. In such a situation, the information screen is successively displayed on the LCD 16. On the other hand, when the CPU 11 judges that the card C is inserted into the insertion port 2*b* and the CPU 11 judges that the document D is set on the paper feed tray on the basis of the signal inputted from the document detection sensor 22 (ST912: Yes, ST913: Yes/corresponding to T22 described above), then the CPU 11 allows the LCD 16 to display first error screen (screen 62) in place of the information screen (ST917).

When the CPU 11 judges that the card C is taken out of the insertion port 2*b* during the display of the first error screen (ST918: Yes/corresponding to T24 described above), the CPU 11 allows the process to proceed to ST911. Accordingly, the information screen (screen 61*a*) is displayed on the LCD 16 in place of the first error screen. On the other hand, when the CPU 11 judges that the card C is not taken out of the insertion port 2*b* (ST918: No), the CPU 11 judges whether or not the document D is taken out of the paper feed tray and the cover is closed (ST915). When the CPU 11 judges that the cover 3 is closed during the display of the first error screen (screen 62) (ST915: Yes), then the CPU 11 transports the card C to stop the card C in the state in which the card C is interposed between the transport rollers 104, 105, and the CPU 11 allows the process to proceed to ST804 (see FIG. 8). On the other hand, when the CPU 11 judges that the cover 3 is not closed in the state in which the first error screen is displayed (ST915: No), the CPU 11 allows the process to proceed to ST913.

When the CPU 11 judges in ST912 and ST913 that the card C is inserted into the insertion port 2*b* but the document D is not set on the paper feed tray (ST913: Yes, ST913: No/corresponding to T26 described above), the CPU 11 allows the LCD 16 to display the second error screen (screen 63) in place of the information screen (ST914). When the CPU 11 judges that the cover 3 is closed during the display of the second error screen (ST915: Yes/corresponding to T27 described above), the CPU 11 transports the card C to stop the card C in the state in which the card C is interposed between the transport roller 104, 105 (ST916/correspond to S21 described above). Subsequently, the CPU 11 allows the process to proceed to ST804 (see FIG. 8). Accordingly, the scan setting designation screen 52 is displayed on the LCD 16 in place of the second error screen (screen 63). On the other hand, when the CPU 11 judges that the cover 3 is not closed in the state in which the second error screen is displayed (ST915: No), the CPU 11 allows the process to proceed to ST913. When the CPU 11 judges that the document D is set on the paper feed tray composed of the cover 3 which is open in ST913 (ST913: Yes/corresponding to T28 described above), the CPU 11 allows the LCD 16 to display the first error screen (screen 62) in place of the second error screen (screen 63) (ST917).

When it is judged that the card C is inserted into the insertion port 2*b* during the display of the screen during scan execution (screen 61*c*) (ST907: Yes/corresponding to T23 described above), the CPU 11 allows the LCD 16 to display the first error screen (screen 62) in place of the screen during scan execution (ST908). In ST908, the reading of the card C by the image reading sensor 18 is interrupted, and the driving motor 19 is stopped to stop the transport of the card C. When the CPU 11 judges that the card C is taken out of the insertion port 2*b* during the display of the first error screen (ST909: Yes/corresponding to T24 described above), the CPU 11 allows the process to proceed to ST906. Accordingly, the screen during scan execution (screen 61*c*) is displayed on the LCD 16 in place of the first error screen. In this case, the operation of the driving motor 19 is restarted to transport the card C, and the reading of the card C by the image reading sensor 18 is restarted. On the other hand, when the CPU 11 judges that the card C is not taken out of the insertion port 2*b* (ST909: No), the CPU 11 waits until the card C is taken out of the insertion port 2*b*.

When the card C is not inserted into the insertion port 2*b* and the reading of the document D which is being executed is not completed as well during the display of the screen during scan execution (ST907: No, ST926: No), the CPU 11 allows the process to proceed to ST907. On the other hand, when the reading of the document D which is being executed is completed in ST926 (ST926: Yes), this process is completed.

According to the CDS 1 of this embodiment, the soft key, which includes, for example, the discharge key 52*e* to make it possible to discharge the card C interposed between the transport rollers 104, 105, is displayed on the screen displayed on the LCD 16. Therefore, the operability is excellent when the reading of the card C interposed between the transport rollers 104, 105 is stopped to discharge the card C. Further, the card C is discharged by using the soft key displayed on the LCD 16. Therefore, even when the CDS 1 is constructed such that the operation key 15 is not exposed in the state in which the cover 3 is closed, it is possible to discharge the card C interposed between the transport rollers 104, 105. Therefore, the card C can be prevented from being forcibly pulled out and the card C can be prevented from being damaged.

In the respective embodiments described above, the CDS 1 is an example of the image forming apparatus. The control program 12*a* is an example of the image forming program. The transport rollers 104, 105 are examples of the transport roller. The image reading sensor 18 is an example of the reading means. The card detection sensor 21, the document detection sensor 22, and the CPU 11 are examples of the manuscript detecting means. the LCD 16 is an example of the display unit. the CPU 11 is an example of the computer, the transport control means, the display control means, the setting designating means, and the mode setting means. The waiting screen 51 is an example of the first screen. The scan setting designation screen 52 is an example of the second screen. The screen before scan execution 53 is an example of the third screen. The screen during scan execution 54 is an example of the fourth screen. The discharge execution screen 56 is an example of the fifth screen. The error screens 62, 63 are examples of the error screen. The discharge key 52*a* and the discharge key 56*a* are examples of the discharge designator (indicator or specifier). The Back key 53*b* is an example of the return designator. The Start key 53*c* is an example of the start designator. The Cancel key 54*b* is an example of the cancel designator. The default key 52*a* and the shortcut keys 52*b* to 52*d* are examples of the setting keys. The cover 3 is an example of the cover. The cover open/closed detection sensor 20 and the CPU 11 are examples of the open/closed detecting means. The document D is an example of the manuscript of the first type. The document reading mode is an example of the first mode. The card C is an example of the manuscript of the second type. The card reading mode is an example of the second mode. The first route V1 is an example of the first transport route. The second route V2 is an example of the second transport route. The route 102 is an example of a commonly usable route. The merging portion 109 is an example of the merging portion.

The present teaching has been explained above on the basis of the embodiment. However, the present teaching is not limited to the embodiment described above at all. It can be easily presumed that various improvements and changes can be made within a range without deviating from the gist or essential characteristics of the present teaching. For example, in the embodiment described above, the CDS 1 as the monofunction scanner apparatus is exemplified as an example of the image forming apparatus by way of example. However, a multifunction peripheral apparatus (multifunction machine), which also has functions other than the scan function, may be also an example of the image forming apparatus.

The embodiment described above is constructed such that the Back key 15*a*, the Home key 15*b*, and the Cancel key 15*c* are provided on the upper surface of the main body unit 2. However, it is also allowable to adopt such a construction that soft keys, which correspond to the keys 15*a* to 15*c*, are displayed on the screen displayed on the LCD 16, if necessary, without providing the hard keys such as the keys 15*a* to 15*c*.

The embodiment described above is constructed such that the waiting screen 51 is displayed in place of the scan setting designation screen 52 when the discharge key 52*e* is operated on the scan setting designation screen 52. However, the screen to be displayed is not limited to the waiting screen 51, which may be any other screen. Similarly, when the card C is discharged, the waiting screen 51 is displayed in place of the screen (for example, the discharge execution screen 56) displayed at that time, but the present teaching is not limited thereto. It is also allowable to display any other screen. The embodiment described above is constructed such that the information screen 55, which includes the message 55*a* to suggest the closing of the cover 3, is displayed on the LCD 16 when the cover 3 is opened when each of the screens 52 to 54 is displayed. However, it is also allowable to adopt such a construction that the message 55*a* is displayed on each of the screens 52 to 54 in a pop-up manner without displaying the information screen 55. Alternatively, in the embodiment described above, the information may be notified or informed by using an image and/or a mark in place of the message based on the letters or in addition to the message based on the letters.

The embodiment described above is constructed such that the card C is interposed between the transport rollers 104, 105 provided in the state of being brought in contact under pressure with each other, when the card C, which is inserted from the insertion port 2*b*, is detected by the detection sensor 21 in the state in which the cover 3 is closed. In place thereof, it is also allowable to adopt the following construction. That is, the transport rollers 104, 105 are separated from each other in the state in which the card C is not detected by the card detection sensor 21. When the card C is detected by the card detection sensor 21, then the separated transport rollers 104, 105 are moved, and the card C is interposed (nipped) between the transport rollers 104, 105. Therefore, the phrase "manuscript is interposed by the transport roller", which is referred to in claim, includes both of the case in which the card C is interposed between the transport rollers 104, 105 provided in the state of being brought in contact under pressure with each other as described in the foregoing embodiment and the case in which the card C is interposed between the transport rollers 104, 105 provided in the separated state as described in this modified embodiment.

The embodiment described above is constructed such that the card C as the reading object is inserted from the insertion port 2*b* which is provided on the back surface of the CDS 1. However, it is also allowable to adopt such a construction that the insertion port for inserting the card C as the reading object is provided on the front surface of the CDS 1, for example, such a construction that the card C as the reading object is inserted from the discharge port 2*a*1. Further, the transport route for the card C (first route V1) is not limited to the route extending from the back surface side to the front surface side. For example, when the insertion port for inserting the card C is provided on the front surface side, the transport route for the card C inserted from the front surface of the CDS 1 may be either the route in which the card C is discharged from the back surface or the route in which the card C is discharged from the front surface after the reading by the image reading sensor 18.

In the embodiment described above, the touch to the soft key displayed on the LCD 16 such as the discharge key 52*e* and the Back key 53*b* is exemplified as the input operation. However, the input operation may be the following operation. That is, a cursor, which is movable in the screen, is moved by means of, for example, a cursor movement key, and the operation is performed such that a key, which instructs the execution, is operated in a state in which the cursor is adjusted to a desired soft key. Alternatively, the input operation may be the following operation. That is, the CDS 1 is constructed so that a pointing device such as a mouse or the like can be connected thereto. The cursor is moved by means of the pointing device. The operation is performed by performing a predetermined operation such as double-click or the like in a state in which the cursor is adjusted to a desired soft key.

The embodiment described above is constructed such that various screens including, for example, the waiting screen 51 are displayed on the LCD 16 provided for the CDS 1. However, it is also allowable to adopt such a construction that the screens are displayed on a display of an external apparatus such as PC or the like connected to the CDS 1. In such a case, it is also allowable to adopt such a construction that the setting and instruction are inputted into the CDS 1 by using the screen displayed on the display of the external apparatus.

In the embodiment described above, the CDS 1 is constructed as the scanner wherein the card C inserted from the insertion port 2*b* is read in the state in which the cover 3 is closed and the document D inserted from the insertion port 2*c* is read in the state in which the cover 3 is open. However, the manuscript, which can be read depending on the open/closed state of the cover 3, is not limited to the card C and the document D. For example, the both may be documents, or the both may be cards. Further, the CDS 1 may be constructed such that the manuscript is read only in the state in which the cover 3 is closed.

What is claimed is:

1. An image forming apparatus comprising:
a transport roller configured to transport a manuscript;
a reading mechanism configured to read the manuscript transported by the transport roller;
a manuscript sensor configured to detect the manuscript;
a transport controller configured to control the transport roller so that the manuscript is interposed by the transport roller under a condition that the manuscript is detected by the manuscript sensor;
a display unit;
a display controller configured to:
control the display unit to display a first screen under a condition that the manuscript is not detected by the manuscript sensor; and
control the display unit to display a second screen in place of the first screen, wherein the second screen shows a representation of a discharge function to discharge the manuscript interposed by the transport roller from the image forming apparatus, and wherein the display unit is controlled to display the second screen under a condition that the manuscript is detected by the manuscript sensor; and
an input device configured to, during display of the second screen, receive an input from a user, wherein the input invokes the discharge function,
wherein the transport controller is configured to control the transport roller to discharge the manuscript interposed by the transport roller from the image forming apparatus without reading the manuscript by the reading mechanism under a condition that the input invoking the discharge function is received by the input device.

2. The image forming apparatus according to claim 1, wherein the display controller is configured to control the display unit to display the first screen in place of the second screen under a condition that the discharge of the manuscript by the transport controller is started in response to the input invoking the discharge function.

3. The image forming apparatus according to claim 1,
wherein the second screen shows a representation of a setting function for designating a setting of the reading mechanism, and
wherein the display controller is configured to:
control the display unit to display a third screen showing:
setting contents corresponding to the representation of the setting function shown on the second screen; and
a representation of a return function to display the second screen in place of the third screen,
wherein the display controller is configured to control the display unit to display the third screen under a condition that the input device, during display of the second screen, receives an input from the user invoking the setting function, and
wherein the display controller is configured to control the display unit to display the second screen in place of the third screen and the transport controller is configured to maintain a state in which the manuscript is interposed by the transport roller under a condition that the input device, during display of the third screen, receives an input from the user invoking the return function.

4. The image forming apparatus according to claim 3,
wherein the third screen further shows a representation of a start function for starting reading of the manuscript by the reading mechanism; and
wherein the transport controller is configured to control the transport roller to transport the manuscript interposed by the transport roller to a position where the manuscript can be read by the reading mechanism under a condition that an input from the user invoking the start function is received by the input device during display of the third screen.

5. The image forming apparatus according to claim 4,
wherein the display controller is configured to control the display unit to display a fourth screen in place of the third screen, wherein the fourth screen shows a representation of a cancel function to cancel the reading of the manuscript by the reading mechanism, wherein the display controller is configured to control the display unit to display the fourth screen under a condition that an input from the user invoking the cancel function is received by the input device during display of the third screen,
wherein the transport controller is configured to control the transport roller to discharge the manuscript interposed by the transport roller from the image forming apparatus without completing the reading of the manuscript by the reading mechanism under a condition that an input from the user invoking the cancel function is received by the input device; and
wherein the display controller is configured to control the display unit to display the first screen in place of the fourth screen under a condition that the input from the user invoking the cancel function is received by the input device.

6. The image forming apparatus according to claim 1,
wherein the second screen further shows a representation of a plurality of setting functions for designating settings of the reading mechanism; and
wherein the input device is further configured to receive one or more inputs that invoke one or more of the plurality of setting functions.

7. The image forming apparatus according to claim 1, further comprising:
a main body configured to store the reading mechanism;
a cover configured to open with respect to the main body to an open state and to close with respect to the main body to a closed state;
an open/closed sensor configured to detect the open state of the cover and the closed state of the cover; and
a mode setting mechanism configured to make setting to a first mode and a second mode, the first mode being a mode in which the manuscript of a first type is read by the reading mechanism under a condition that the open/closed sensor detects the open state, and the second mode being a mode in which the manuscript of a second type is read by the reading mechanism under a condition that the open/closed sensor detects the closed state,
wherein the transport controller is configured to control the transport roller to interpose the manuscript of the second type under the condition that the open/closed sensor detects the closed state and the manuscript sensor detects the manuscript of the second type,
wherein the display controller is configured to:
control the display unit to display a suggestion to close the cover while the transport controller maintains a state in which the manuscript of the second type is interposed by the transport roller under a condition that the open/closed sensor detects that the cover is in the open state; and
control the display unit to display a fifth screen, wherein the fifth screens shows the representation of the discharge function, and wherein the display unit is controlled to display the fifth screen under a condition that the open/closed sensor detects that the cover is switched from the open state to the closed state following the display of the suggestion to close the cover, and
wherein the transport controller is configured to control the transport roller to discharge the manuscript of the second type interposed by the transport roller from the image forming apparatus without performing the reading of the manuscript by the reading mechanism under a condition that an input invoking the discharge function shown in the fifth screen is received by the input device.

8. The image forming apparatus according to claim 7,
wherein the transport controller is configured to control the transport roller to not interpose the manuscript of the second type under a condition that the manuscript sensor detects the manuscript of the second type on condition that the open/closed sensor detects the open state of the cover,
wherein the display controller is configured to control the display unit to display a predetermined error screen under a condition that the manuscript sensor detects the manuscript of the second type on condition that the open/closed sensor detects the open state of the cover,
wherein the transport controller is configured to control the transport roller to interpose the manuscript of the second type under a condition that the open/closed sensor detects the closed state of the cover in a state in which the error screen is displayed on the display unit, and
wherein the display controller is configured to control the display unit to display the second screen in place of the error screen under a condition that the open/closed sensor detects the closed state of the cover in the state in which the error screen is displayed on the display unit.

9. The image forming apparatus according to claim 8, further comprising:
  a first transport route along which the manuscript of the first type is transported; and
  a second transport route along which the manuscript of the second type is transported,
  wherein the first transport route and the second transport route are the routes in which outlet sides of the respective routes are commonly used,
  wherein the reading mechanism is configured such that the reading mechanism reads the manuscript of the first type transported along the first transport route or the manuscript of the second type transported along the second transport route in the route which is commonly used,
  wherein the transport roller is provided at a merging portion of the first transport route and the second transport route,
  wherein the transport controller is configured to control the transport roller to not interpose the manuscript of the first type and the manuscript of the second type under a condition that the manuscript sensor detects the manuscript of the first type and the manuscript of the second type respectively on condition that the open/closed sensor detects the open state of the cover, and
  wherein the display controller is configured to control the display unit to display the second screen in place of the error screen under a condition that the open/closed sensor detects the closed state of the cover, the manuscript sensor detects the manuscript of the second type, and the manuscript sensor does not detect the manuscript of the first type, in the state in which the error screen is displayed on the display unit.

10. The image forming apparatus according to claim 7,
  wherein the transport controller is configured to control the transport roller to not interpose the manuscript of the second type under a condition that the manuscript sensor detects the manuscript of the second type on condition that the open/closed sensor detects the open state of the cover, and
  wherein the display controller is configured to:
    control the display unit to display a predetermined error screen under a condition that the manuscript sensor detects the manuscript of the second type on condition that the open/closed sensor detects the open state of the cover; and
    the screen concerning the first mode, which has been displayed on the display unit immediately before the display of the error screen, is displayed on the display unit in place of the error screen under a condition that the manuscript of the second type, which has been detected by the manuscript sensor, is not detected in the state in which the error screen is displayed on the display unit.

11. The image forming apparatus according to claim 10, further comprising:
  a first transport route along which the manuscript of the first type is transported; and
  a second transport route along which the manuscript of the second type is transported,
  wherein the first transport route and the second transport route are the routes in which outlet sides of the respective routes are commonly used;
  wherein the reading mechanism is configured to read the manuscript of the first type transported along the first transport route or the manuscript of the second type transported along the second transport route in the route which is commonly used,
  wherein the transport roller is provided at a merging portion of the first transport route and the second transport route, and
  wherein the transport controller is configured to:
    control the transport roller to not interpose each of the manuscript of the first type and the manuscript of the second type under a condition that the manuscript sensor detects the manuscript of the first type and the manuscript of the second type respectively on condition that the open/closed sensor detects the open state of the cover; and
    control the transport roller to interpose the manuscript of the first type under a condition that the manuscript sensor detects the manuscript of the first type and the manuscript of the second type, which has been detected by the manuscript sensor, is not detected in the state in which the error screen is displayed on the display unit.

12. A non-transitory computer readable medium storing an image forming program to be executed by a computer of an image forming apparatus,
  wherein the image forming apparatus comprises:
    a transport roller configured to transport a manuscript;
    a reading mechanism configured to read the manuscript transported by the transport roller;
    a manuscript sensor configured to detect the manuscript;
    a display unit; and
    an input device,
  wherein the image forming program configures the computer to function as:
    a transport controller configured to control the transport roller to interpose the manuscript under a condition that the manuscript sensor detects the manuscript; and
    a display controller configured to:
      control the display unit to display a first screen under a condition that the manuscript sensor does not detect the manuscript;
      control the display unit to display a second screen in place of the first screen, wherein the second screen shows a representation of a discharge function to discharge the manuscript interposed by the transport roller from the image forming apparatus, and wherein the display unit is controlled to display the second screen under a condition that the manuscript sensor detects the manuscript; and
      control the transport controller to discharge the manuscript interposed by the transport roller from the image forming apparatus without reading the manuscript by the reading mechanism under a condition that input device, during display of the second screen, receives an input from a user, wherein the input invokes the discharge function.

13. An image forming method to be executed by an image forming apparatus, the image forming apparatus comprising:
  a transport roller configured to transport a manuscript;
  a reading mechanism configured to read the manuscript transported by the transport roller;
  a manuscript sensor configured to detect the manuscript;
  a display unit; and
  an input device,
  wherein the image forming method comprises:
    controlling the transport roller to interpose the manuscript under a condition that the manuscript is detected by the manuscript sensor;
    controlling the display unit to display a first screen under a condition that the manuscript is not detected by the manuscript sensor;

controlling the display unit to display a second screen in place of the first screen, wherein the second screen shows a representation of a discharge function to discharge the manuscript interposed by the transport roller from the image forming apparatus, and wherein the display unit is controlled to display the second screen under a condition that the manuscript is detected by the manuscript sensor; and controlling the transport roller to discharge the manuscript interposed by the transport roller from the image forming apparatus without reading the manuscript by the reading mechanism under a condition that the input device, during display of the second screen, receives an input from a user, wherein the input invokes the discharge function.

* * * * *